United States Patent
Ravishankar et al.

(10) Patent No.: US 10,609,635 B2
(45) Date of Patent: Mar. 31, 2020

(54) NETWORK SHARING BY MULTIPLE SERVICE PROVIDERS IN A 3GPP FRAMEWORK USING SINGLE CORE NETWORK

(71) Applicant: Hughes Network Systems, LLC, Germantown, MD (US)

(72) Inventors: Channasandra Ravishankar, Clarksburg, MD (US); Nassir Benammar, Rockville, MD (US); Gaguk Zakaria, College Park, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 85 days.

(21) Appl. No.: 15/914,894

(22) Filed: Mar. 7, 2018

(65) Prior Publication Data

US 2018/0262913 A1 Sep. 13, 2018

Related U.S. Application Data

(60) Provisional application No. 62/470,043, filed on Mar. 10, 2017.

(51) Int. Cl.
*H04W 48/18* (2009.01)
*H04W 16/02* (2009.01)
(Continued)

(52) U.S. Cl.
CPC ........... *H04W 48/18* (2013.01); *H04W 16/02* (2013.01); *H04W 60/00* (2013.01); *H04W 76/11* (2018.02); *H04W 8/26* (2013.01)

(58) Field of Classification Search
CPC .............. H04W 76/021; H04W 76/11; H04W 48/17–20; H04W 16/02–04; H04W 76/12
See application file for complete search history.

(56) References Cited

U.S. PATENT DOCUMENTS

| | | |
|---|---|---|
| 2002/0022483 A1 | 2/2002 | Thompson et al. |
| 2012/0026961 A1 | 2/2012 | Pittmann et al. |
| (Continued) | | |

FOREIGN PATENT DOCUMENTS

WO    WO2011047734 A1    4/2011

OTHER PUBLICATIONS

USPTO, "International Search Report and Written Opinion", PCT/US2018/021402, dated Jun. 4, 2018.

*Primary Examiner* — Marcus Smith
(74) *Attorney, Agent, or Firm* — Potomac Technology Law, LLC

(57) ABSTRACT

A method is provided for network equipment and resource sharing amongst service providers within a communications network. Parameters are determined, each associated with a an SP(ID) identifying a respective service provider. The Parameters relate to network parameters of a that are utilized for standard network processes unrelated to service provider identification. A control message is received, including a UT-ID associated with a user terminal (UT). The UT is associated with one service provider. The control message is received as part of configuration of network services for the UT. One of the Parameters is determined that is associated with the UT-ID, and one SP(ID) is determined that is associated with the determined Parameter. Communications channels are provided to the UT for network services. The communications channels are configured based on share parameters defining a share of network resources allocated to the service provider to which the determined SP(ID) corresponds.

28 Claims, 10 Drawing Sheets

(51) Int. Cl.
*H04W 76/11* (2018.01)
*H04W 60/00* (2009.01)
*H04W 8/26* (2009.01)

(56) References Cited

U.S. PATENT DOCUMENTS

| | | |
|---|---|---|
| 2013/0246631 A1 | 9/2013 | Gonzales et al. |
| 2013/0303114 A1 | 11/2013 | Ahmad et al. |
| 2017/0164349 A1* | 6/2017 | Zhu ........................ H04W 48/18 |
| 2018/0013680 A1* | 1/2018 | Bull ........................ H04L 47/215 |
| 2019/0020996 A1* | 1/2019 | Zhang ..................... H04W 8/14 |
| 2019/0021047 A1* | 1/2019 | Zong ....................... H04W 76/11 |
| 2019/0098569 A1* | 3/2019 | Hou ........................ H04W 48/18 |
| 2019/0124508 A1* | 4/2019 | Watfa ..................... H04W 8/02 |

* cited by examiner

NETWORK SHARING BY MULTIPLE SERVICE PROVIDERS IN A 3GPP FRAMEWORK USING SINGLE CORE NETWORK

RELATED APPLICATIONS

This application claims the benefit of the earlier filing date under 35 U.S.C. § 119(e) from U.S. Provisional Application Ser. No. 62/470,043 (filed 2017 Mar. 10), the entirety of which is incorporated by reference herein.

BACKGROUND

The 3rd Generation Partnership Project (3GPP) is a collaboration between several telecommunications standard development organizations (including ARIB, ATIS, CCSA, ETSI, TSDSI, TTA, TTC), which are collectively known as the Organizational Partners. The 3GPP was initially formed to provide a globally applicable third-generation (3G) mobile phone system specification, based on the evolved Global System for Mobile Communications (GSM) specifications, within the scope of the International Mobile Telecommunications-2000 project of the International Telecommunication Union (ITU). The project covers cellular telecommunications network technologies, including radio access, the core transport network, and service capabilities—including work on codecs, security, quality of service—and thus provides complete system specifications. The specifications also provide hooks for non-radio access to the core network, and for interworking with Wi-Fi networks. The project scope also includes the development and maintenance of GSM and related 2G and 2.5G standards (including GPRS and EDGE), UMTS and related 3G standards (including HSPA), LTE and related 4G standards, and an evolved IP Multimedia Subsystem (IMS). 3GPP standardization encompasses Radio, Core Network and Service architecture.

Multi-operator core network (MOCN) and the Gateway core network (GWCN) described in the 3GPP standards allow sharing of the eNodeB (E-UTRAN) by multiple operators using their own core network equipment, and the GWCN allows for Mobility Management Entity (MME) sharing as well.

The foregoing systems and standards, however, fail to provide for the sharing of core network (CN) equipment and eNodeB equipment between multiple service providers, which imposes a high level of infrastructure costs and longer time to market for development and deployment of new systems, and also leads to increased complexity and resource usage by multiple networks each deploying independent CN, eNodeB and gNodeB equipment.

What is needed, therefore, are approaches for sharing of common core network (CN) eNodeB and gNodeB equipment to reduce service provider network deployment time and costs and reduce overall complexity and resource usage amongst multiple networks in wireless mobile communications networks (e.g., 3G, 4G and 5G networks).

Some Example Embodiments

Embodiments of the present invention advantageously address the foregoing requirements and needs, as well as others, by providing approaches for sharing of common core network (CN) eNodeB and gNodeB equipment to reduce service provider network deployment time and costs and reduce overall complexity and resource usage amongst multiple networks in wireless mobile communications networks (e.g., 3G, 4G and 5G networks). Once such common network resources are deployed and provisioned, each service provider subsequently controls how to market, sell and manage the services/packages to their respective customer within their allocated resources in the shared network.

According to example embodiments, multiple service providers (SP) share eNodeB and core network resources, along with the corresponding radio resources, using the current 3GPP architecture (e.g., Evolved Packet Core (EPC) architecture). The core network communicates with the eNodeB and the user terminals (UTs) associated with a respective service provider based on the approaches provided by such embodiments, while relying on the current communications parameters and interfaces. Such embodiments also apply to prior 3GPP radio access technologies or satellite technologies that employ similar parameters. Further, the approaches of the embodiments of the present invention do not require modification or assistance of existing User Terminal (UT), and do not require modification of the respective protocol(s). The network providers control how the resources are shared between the service providers and the proportions of the radio resources allocated to each of the participating service providers. Embodiments of the present invention also provide a conduit for each UT to be assigned to its service provider, and to be scheduled as part of the service provider allocated resources at the eNodeB.

According to example embodiments of the present invention a method is provided for facilitating sharing of equipment and network resources of a communications network, amongst a plurality of service providers. A plurality of ID parameters are determined, wherein each ID parameter is associated with a service provider identifier (SP(ID)) that corresponds with a respective service provider, wherein the ID parameters relate to a plurality of network parameters of a specific type that are utilized for one or more standard network processes unrelated to service provider identification. A network device of a first node of the communications network receives a control message that includes a user terminal identifier (UT-ID) associated with a user terminal (UT) of the communications network, wherein the UT is associated with a one service provider of the plurality of service providers, wherein the control message is received as part of an initiation or configuration of one or more services of the communications network for the UT. The network device of the first node of the communications network determines a one of the plurality of ID parameters that is associated with the UT-ID. A one SP(ID) is determined that is associated with the determined ID parameter. One or more data communications channels are provided to the UT in connection with the one or more services of the communications network, wherein the one or more data communications channels are configured based on share parameters defining a share of the network resources allocated to the one service provider to which the determined SP(ID) corresponds. Usage by the UT of the one or more services of the communications network via the data communications channels provided to the UT based on the share parameters is managed and monitored.

According to one example embodiment of the method, (i) the communications network is a 3GPP 4G LTE network, (ii) the initiation or configuration of the one or more services of the communications network corresponds to an attach process for registration of the UT with the communications network, (iii) the specific type of the network parameters to which the ID parameters relate is a quality of service (QoS) class identifier (QCI) parameter, (iv) the UT-ID comprises an international mobile subscriber identity (IMSI) number associated with the UT, (v) the determination of the one of the plurality of ID parameters that is associated with the UT-ID comprises a mapping of the IMSI to the one ID parameter based on a predetermined correlation mapping of UT-IDs to respective ID parameters, and (vi) the determination of the one SP(ID) that is associated with the determined ID parameter comprises a mapping of the one ID parameter to the one SP(ID) based on a predetermined correlation mapping of ID parameters to respective SP(ID)s. By way of example, the network device of the first node of the communications network is a policy and rules charging function (PCRF) device, the determination of the one SP(ID) that is associated with the determined ID parameter is performed by a mobility management entity (MME) of a second node of the communications network, and the MME Determines a one QCI parameter that is associated with the determined ID parameter by mapping the one ID parameter to the one QCI parameter based on a predetermined correlation mapping of ID parameters to respective QCI parameters. By way of further example, an eNodeB of a third node of the communications network determines the one SP(ID) that is associated with the determined ID parameter by mapping the one ID parameter to the one SP(ID) based on the predetermined correlation mapping of ID parameters to respective SP(ID)s, and determines the one QCI parameter that is associated with the determined ID parameter by mapping the one ID parameter to the one QCI parameter based on the predetermined correlation mapping of ID parameters to respective QCI parameters.

According to a further example embodiment of the method, (i) the communications network is a 3GPP 4G LTE network, (ii) the initiation or configuration of the one or more services of the communications network corresponds to an attach process for registration of the UT with the communications network, (iii) the specific type of the network parameters to which the ID parameters relate is an allocation and retention priority (ARP) parameter, (iv) the UT-ID comprises an international mobile subscriber identity (IMSI) number associated with the UT, (v) the determination of the one of the plurality of ID parameters that is associated with the UT-ID comprises a mapping of the IMSI to the one ID parameter based on a predetermined correlation mapping of UT-IDs to respective ID parameters, and (vi) the determination of the one SP(ID) that is associated with the determined ID parameter comprises a mapping of the one ID parameter to the one SP(ID) based on a predetermined correlation mapping of ID parameters to respective SP(ID)s. By way of example, the network device of the first node of the communications network is a policy and rules charging function (PCRF) device, the determination of the one SP(ID) that is associated with the determined ID parameter is performed by an eNodeB of a second node of the communications network, and the eNodeB determines a one ARP parameter that is associated with the determined ID parameter by mapping the one ID parameter to the one ARP parameter based on a predetermined correlation mapping of ID parameters to respective ARP parameters.

According to a further example embodiment of the method, (i) the communications network is a 3GPP 4G LTE network, (ii) the initiation or configuration of the one or more services of the communications network corresponds to an attach process for registration of the UT with the communications network, (iii) the specific type of the network parameters to which the ID parameters relate is an S1AP identifier (MME-UE-S1AP-ID) for the UT, (iv) the UT-ID comprises an international mobile subscriber identity (IMSI) number associated with the UT, (iv) the determination of the one of the plurality of ID parameters that is associated with the UT-ID comprises assigning a one MME-UE-S1AP-ID to the UT from a group of MME-UE-S1AP-IDs associated with the one service provider with which the UT is associated, and (v) the determination of the one SP(ID) that is associated with the determined ID parameter comprises a mapping of the one MME-UE-S1AP-ID to the one SP(ID) based on a predetermined correlation mapping of MME-UE-S1AP-IDs to respective SP(ID)s. By way of example, the network device of the first node of the communications network is a mobility management entity (MME), and the determination of the one SP(ID) that is associated with the determined ID parameter is performed by an eNodeB of a second node of the communications network.

According to a further example embodiment of the method, (i) the communications network is a 3GPP 4G LTE network, (ii) the initiation or configuration of the one or more services of the communications network corresponds to an attach process for registration of the UT with the communications network, (iii) the specific type of the network parameters to which the ID parameters relate is a tunnel endpoint identifier (TEID) of a data tunnel of the UT through the communications network, (iv) the determination of the one of the plurality of ID parameters that is associated with the UT-ID comprises assigning a one TEID for the data tunnel of the UT from a group of TEIDs associated with the one service provider with which the UT is associated, and (v) the determination of the one SP(ID) that is associated with the determined ID parameter comprises a mapping of the one TEID to the one SP(ID) based on a predetermined correlation mapping of TEIDs to respective SP(ID)s. By way of example, the network device of the first node of the communications network is a serving gateway (SGW), and the one TEID assigned to the UT is a GTP tunnel endpoint identifier of the SGW, and the determination of the one SP(ID) that is associated with the determined ID parameter is performed by an eNodeB of a second node of the communications network.

According to a further example embodiment of the method, (i) the communications network is a 3GPP 4G LTE network, (ii) the initiation or configuration of the one or more services of the communications network corresponds to an attach process for registration of the UT with the communications network, (iii) the specific type of the network parameters to which the ID parameters relate is an IP Address of the UT, (iv) the determination of the one of the plurality of ID parameters that is associated with the UT-ID comprises assigning a one IP Address to the UT from a group of IP Addresses associated with the one service provider with which the UT is associated, and (v) the determination of the one SP(ID) that is associated with the determined ID parameter comprises a mapping of the one IP Address to the one SP(ID) based on a predetermined correlation mapping of IP Addresses to respective SP(ID)s. By way of example, the network device of the first node of the communications network is a policy and rules charging function (PCRF) device; and the determination of the one SP(ID) that is associated with the determined ID parameter is performed by an eNodeB of a second node of the communications network.

According to a further example embodiment of the method, (i) the communications network is a 3GPP 4G LTE network, (ii) the initiation or configuration of the one or more services of the communications network corresponds to an attach process for registration of the UT with the communications network, (iii) the specific type of the network parameters to which the ID parameters relate is a public land mobile network (PLMN-ID) identifier (PLMN-ID), (iv) the determination of the one of the plurality of ID parameters that is associated with the UT-ID comprises determining a group of new PLMN-IDs for a one PLMN-ID of a core network associated with the one service provider with which the UT is associated, and (v) the determination of the one SP(ID) that is associated with the determined ID parameter comprises matching a first PLMN-ID of the UT with a one of the new PLMN-IDs and determining the one SP(ID) as that of the one service provider with which the group of new PLMN-IDs is associated. By way of example, the network device of the first node of the communications network is an eNodeB.

According to example embodiments of the present invention a communications network that facilitates sharing of network equipment and network resources of the communications network, amongst a plurality of service providers. The communications network comprises a first network device of a first node of the communications network, a second network device of a second node of the communications network, and one or more user terminals. The first network device is configured to receive a control message that includes a user terminal identifier (UT-ID) associated with a one user terminal (UT) of the one or more user terminals, wherein the UT is associated with a one service provider of the plurality of service providers, wherein the control message is received as part of an initiation or configuration of one or more services of the communications network for the UT. The first network device is further configured to determine a one of a plurality of ID parameters that is associated with the UT-ID, wherein each of the plurality of ID parameters is associated with a service provider identifier (SP(ID)) that corresponds with a respective service provider, wherein the ID parameters relate to a plurality of network parameters of a specific type that are utilized for one or more standard network processes unrelated to service provider identification. The second network device is configured to determine a one SP(ID) that is associated with the determined ID parameter. One or more of the first network device, the second network device and one or more further network devices are configured to provide one or more data communications channels to the UT in connection with the one or more services of the communications network, wherein the one or more data communications channels are configured based on share parameters defining a share of the network resources allocated to the one service provider to which the determined SP(ID) corresponds. One or more of the first network device, the second network device and the one or more further network devices are configured to manage and monitor managing and monitoring usage by the UT of the one or more services of the communications network via the data communications channels provided to the UT based on the share parameters.

According to one example embodiment, the communications network is a 3GPP 4G LTE network, and (i) the initiation or configuration of the one or more services of the communications network corresponds to an attach process for registration of the UT with the communications network, (ii) the specific type of the network parameters to which the ID parameters relate is a quality of service (QoS) class identifier (QCI) parameter, (iii) the UT-ID comprises an international mobile subscriber identity (IMSI) number associated with the UT, (iv) the determination of the one of the plurality of ID parameters that is associated with the UT-ID comprises a mapping of the IMSI to the one ID parameter based on a predetermined correlation mapping of UT-IDs to respective ID parameters, and (v) the determination of the one SP(ID) that is associated with the determined ID parameter comprises a mapping of the one ID parameter to the one SP(ID) based on a predetermined correlation mapping of ID parameters to respective SP(ID)s. By way of example, the first network device is a policy and rules charging function (PCRF) device, the second network device is a mobility management entity (MME), and the second network device is further configured to determine a one QCI parameter that is associated with the determined ID parameter by mapping the one ID parameter to the one QCI parameter based on a predetermined correlation mapping of ID parameters to respective QCI parameters. By way of further example, the communications network further comprises an eNodeB of a third node of the communications network, and the eNodeB is configured to determine the one SP(ID) that is associated with the determined ID parameter by mapping the one ID parameter to the one SP(ID) based on the predetermined correlation mapping of ID parameters to respective SP(ID)s, and wherein the eNodeB is further configured to determine the one QCI parameter that is associated with the determined ID parameter by mapping the one ID parameter to the one QCI parameter based on the predetermined correlation mapping of ID parameters to respective QCI parameters.

According to a further example embodiment, the communications network is a 3GPP 4G LTE network, and (i) the initiation or configuration of the one or more services of the communications network corresponds to an attach process for registration of the UT with the communications network, (ii) the specific type of the network parameters to which the ID parameters relate is an allocation and retention priority (ARP) parameter, (iii) the UT-ID comprises an international mobile subscriber identity (IMSI) number associated with the UT, (iv) the determination of the one of the plurality of ID parameters that is associated with the UT-ID comprises a mapping of the IMSI to the one ID parameter based on a predetermined correlation mapping of UT-IDs to respective ID parameters, and (v) the determination of the one SP(ID) that is associated with the determined ID parameter comprises a mapping of the one ID parameter to the one SP(ID) based on a predetermined correlation mapping of ID parameters to respective SP(ID)s. By way of example, the first network device is a policy and rules charging function (PCRF) device, the second network device is an eNodeB, and the second network device is further configured to determine a one ARP parameter that is associated with the determined ID parameter by mapping the one ID parameter to the one ARP parameter based on a predetermined correlation mapping of ID parameters to respective ARP parameters.

According to a further example embodiment, the communications network is a 3GPP 4G LTE network, and (i) the initiation or configuration of the one or more services of the communications network corresponds to an attach process for registration of the UT with the communications network, (ii) the specific type of the network parameters to which the ID parameters relate is an S1AP identifier (MME-UE-S1AP-ID) for the UT, (iii) the UT-ID comprises an international mobile subscriber identity (IMSI) number associated with the UT, (iv) the determination of the one of the plurality of ID parameters that is associated with the UT-ID comprises assigning a one MME-UE-S1AP-ID to the UT from a group of MME-UE-S1AP-IDs associated with the one service provider with which the UT is associated, and (v) the determination of the one SP(ID) that is associated with the determined ID parameter comprises a mapping of the one MME-UE-S1AP-ID to the one SP(ID) based on a predetermined correlation mapping of MME-UE-S1AP-IDs to respective SP(ID)s. By way of example, the first network device is a mobility management entity (MME), and the second network device is an eNodeB.

According to a further example embodiment, the communications network is a 3GPP 4G LTE network, and (i) the initiation or configuration of the one or more services of the communications network corresponds to an attach process for registration of the UT with the communications network, (ii) the specific type of the network parameters to which the ID parameters relate is a tunnel endpoint identifier (TEID) of a data tunnel of the UT through the communications network, (iii) the UT-ID comprises an international mobile subscriber identity (IMSI) number associated with the UT, (iv) the determination of the one of the plurality of ID parameters that is associated with the UT-ID comprises assigning a one TEID for the data tunnel of the UT from a group of TEIDs associated with the one service provider with which the UT is associated, and (v) the determination of the one SP(ID) that is associated with the determined ID parameter comprises a mapping of the one TEID to the one SP(ID) based on a predetermined correlation mapping of TEIDs to respective SP(ID)s. By way of example, the first network device is a serving gateway (SGW), and the one TEID assigned to the UT is a GTP tunnel endpoint identifier of the SGW, and the second network device is an eNodeB.

According to a further example embodiment, the communications network is a 3GPP 4G LTE network, and (i) the initiation or configuration of the one or more services of the communications network corresponds to an attach process for registration of the UT with the communications network, (ii) the specific type of the network parameters to which the ID parameters relate is an IP Address of the UT, (iii) the UT-ID comprises an international mobile subscriber identity (IMSI) number associated with the UT, (iv) the determination of the one of the plurality of ID parameters that is associated with the UT-ID comprises assigning a one IP Address to the UT from a group of IP Addresses associated with the one service provider with which the UT is associated, and (v) the determination of the one SP(ID) that is associated with the determined ID parameter comprises a mapping of the one IP Address to the one SP(ID) based on a predetermined correlation mapping of IP Addresses to respective SP(ID)s. By way of example, the first network device is a policy and rules charging function (PCRF) device, and the second network device is an eNodeB.

According to a further example embodiment, the communications network is a 3GPP 4G LTE network, and (i) the initiation or configuration of the one or more services of the communications network corresponds to an attach process for registration of the UT with the communications network, (ii) the specific type of the network parameters to which the ID parameters relate is a public land mobile network (PLMN-ID) identifier (PLMN-ID), (iii) the UT-ID comprises an international mobile subscriber identity (IMSI) number associated with the UT, (iv) the determination of the one of the plurality of ID parameters that is associated with the UT-ID comprises determining a group of new PLMN-IDs for a one PLMN-ID of a core network associated with the one service provider with which the UT is associated, and (v) the determination of the one SP(ID) that is associated with the determined ID parameter comprises matching a first PLMN-ID of the UT with a one of the new PLMN-IDs and determining the one SP(ID) as that of the one service provider with which the group of new PLMN-IDs is associated. By way of example, the first network device is an eNodeB.

Still other aspects, features and advantages of the invention are readily apparent from the following detailed description and accompanying drawings, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

Figure 1:
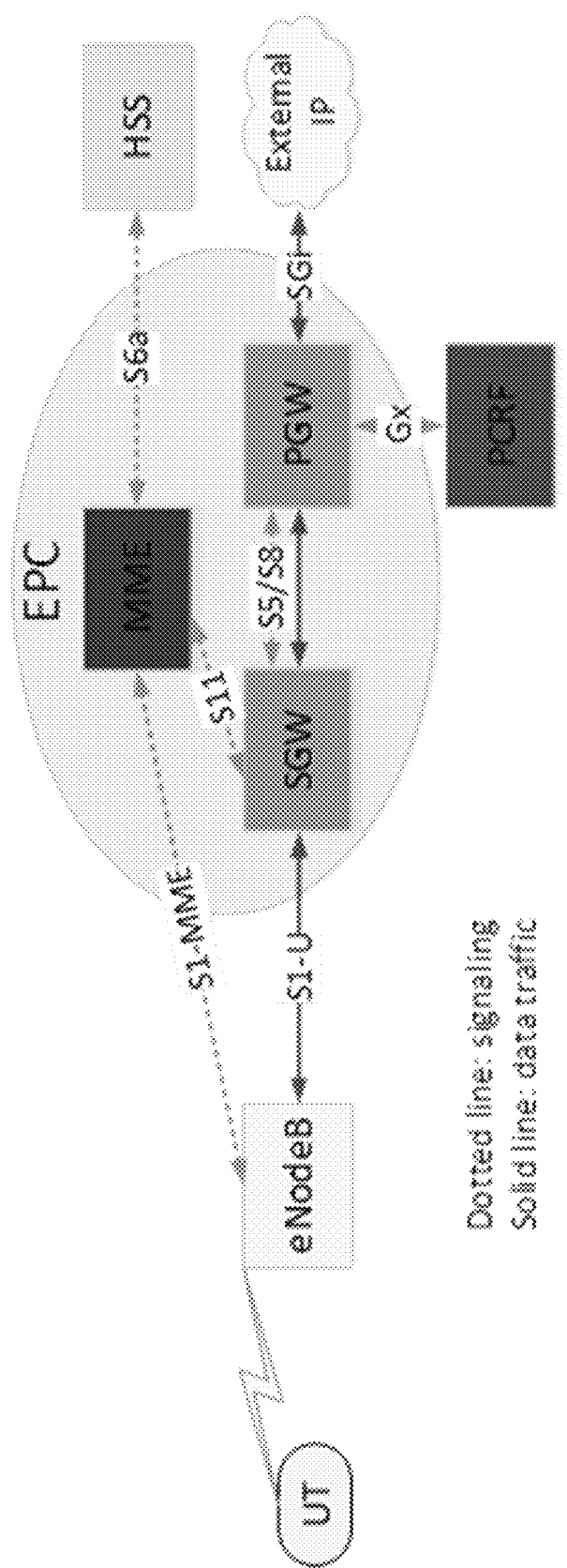
FIG. 1 shows a typical 3GPP LTE network architecture, including an LTE Evolved Packet Core (EPC) Core Network, Policy and Charging Rules Function (PCRF), the Home Subscriber Server (HSS); an external IP network (e.g., the Internet), the E-UTRAN (or eNodeB) and the UTs.

Approaches for sharing of common core network (CN) eNodeB and gNodeB equipment to reduce service provider network deployment time and costs and reduce overall complexity and resource usage amongst multiple networks in wireless mobile communications networks (e.g., 3G, 4G and 5G networks), are described. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Although certain embodiments are discussed below with respect to a 3GPP LTE or 4G network framework, such embodiments are for illustrative purposes only, and could also be applied to other network frameworks, such as a 5G network framework or other mobile wireless communications networks, including satellite communications systems that connect to a 4G core network, as well as other terrestrial communication systems that have similar fields or mechanisms.

The following 3rd Generation Partnership Project (3GPP) Technical Specifications provide further details regarding LTE network architectures and network protocols and operation that provide context and that form a basis for example embodiments of the present invention described herein—these 3GPP Technical Specifications are incorporated herein by reference in their entireties:

3GPP TS 23.203, "Technical Specification Group Services and System Aspects; Policy and charging control architecture," Release 14, V14.2.0, Dec. 16, 2016;

3GPP TS 23.401, "Technical Specification Group Services and System Aspects; General Packet Radio Service (GPRS) enhancements for Evolved Universal Terrestrial Radio Access Network (E-UTRAN) access," Release 14, V14.2.0, Dec. 16, 2016;

3GPP TS 29.212, "Technical Specification Group Core Network and Terminals; Policy and Charging Control (PCC); Reference points," Release 14, V14.2.0, Dec. 19, 2016;

3GPP TS 29.213, "Technical Specification Group Core Network and Terminals; Policy and Charging Control signalling flows and Quality of Service (QoS) parameter mapping," Release 14, V14.2.0, Dec. 19, 2016;

3GPP TS 29.214, "Technical Specification Group Core Network and Terminals; Policy and Charging Control over Rx reference point," Release 14, V14.2.0, Dec. 19, 2016.

3GPP TS 29.274, "Technical Specification Group Core Network and Terminals; 3GPP Evolved Packet System (EPS); Evolved General Packet Radio Service (GPRS) Tunnelling Protocol for Control plane (GTPv2-C); Stage 3," Release 14, V14.2.0, Dec. 17, 2016;

3GPP TS 29.281, "Technical Specification Group Core Network and Terminals; General Packet Radio System (GPRS) Tunnelling Protocol User Plane (GTPv1-U)," Release 13, V13.2.0, Jun. 22, 2016;

3GPP TS 36.300, "Technical Specification Group Radio Access Network; Evolved Universal Terrestrial Radio Access (E-UTRA) and Evolved Universal Terrestrial Radio Access Network (E-UTRAN); Overall description; Stage 2," Release 14, V14.1.0, Dec. 30, 2006; and 3GPP TS 36.413, "Technical Specification Group Radio Access Network; Evolved Universal Terrestrial Radio Access Network (E-UTRAN); S1 Application Protocol (S1AP)," Release 14, V14.1.0, Jan. 11, 2017.

The current 3GPP LTE framework does not provide any mechanism for system operation that facilitates multiple service providers sharing the eNodeB as well as the core network. In order for the sharing to be realized, the service providers should be able to define how the resources will be shared, the proportions of the radio resources to each of the participating service providers. In that context, a sharing agreement between the network operator and each SP, for example, may specify such provisions as the percentage of the network resources allocated to each SP, whether an SP may be allowed to use the resources of another SP while such resources are not being utilized by the other SP, etc. As such, according to certain example embodiments, the network sharing would be on the user plane or data level. Accordingly, in its capacity of administering the allocating the network data resources (e.g., the bandwidth and data traffic bearers), the radio access network (e.g., the eNodeB) should be able to associate each UT with its respective service provider, which would allow the eNodeB to associate the scheduling and resource allocation of each UT with respect to a specific service provider (SP) resource or network share of the respective SP. Further, based on that UT-SP association, the eNodeB would track network resource usage of the respective UTs of each SP, and manage the resource usage based on each SP contract/subscription. In this manner, in accordance with such example embodiments, multiple service providers can each subscribe to a respective level of network resources of a network operator, and provide equipment (UEs) and communications services to its own customer base, where the multiple service providers share the core network and radio access network (e.g., eNodeB) equipment of the network operator.

In accordance with example embodiments of the present invention, the following describes example mechanisms that are provided to assign the UT to its associated service provider (SP), and communicate that assignment to the CN and radio access network entities that require knowledge of the UT-SP association to administer, manage and monitor the network resource usage of the various subscriber customers of each SP.

According to example embodiments, the following parameters can be used by the eNodeB to associate a UT to its respective SP: PLMN-ID, QCI, ARP, MME UE-S1AP-ID, GTP-u TEID, IP address. Further, as used herein, the terminology "Radio Access Network" and "eNodeB" are interchangeable, and the terminology "User Terminal (UT)" and "User Equipment (UE)" are also interchangeable. In further accordance with example embodiments, each CN entity involved in providing the UT-SP association infers or identifies the service provider associated with a UT from the IMSI. Hence the mapping of IMSI to service provider is made available in the CN entity of interest.

Acronyms

| | |
|---|---|
| APN | Access Point Name |
| ARP | Allocation and Retention Priority. |
| CN | Core Network |
| eNB or eNodeB | Evolved Node B |
| EPC | Evolved Packet Core |
| EPS | Evolved Packet System |
| GPRS | General Packet Radio Service |
| GTP | GPRS Tunneling Protocol |
| HSS | Home Subscriber Server |
| IMS | IP Multimedia Sub-system |
| IMSI | International Mobile Subscriber Identity |
| LTE | Long Term Evolution |
| MGW | Media gateway |
| MME | Mobility Management Entity |
| PCRF | Policy and Charging Rules Function |
| PCEF | Policy and Charging Enforcement Function |
| PDN | Packet Data Network |
| PGW | PDN Gateway |
| PLMN-ID | Public Land Mobile Network Identity |
| PSTN | Public Switch Telephone Network |
| QCI | Quality of Service (QoS) Class Identifier |
| QoS | Quality of Service |
| RAN | Radio Access Network |
| SDF | Service Data Flow |
| SGW | Serving Gateway |
| SP | Service Provider |
| SPR | Subscription Profile Repository |
| TEID | Tunnel Endpoint Identifier |
| UT or UE | User Terminal or User Equipment |

4G LTE Network Architecture and Call Flow

FIG. 1 shows a typical 3GPP LTE network architecture, including an LTE Evolved Packet Core (EPC) Core Network, Policy and Charging Rules Function (PCRF), the Home Subscriber Server (HSS); an external IP network (e.g., the Internet), the E-UTRAN (or eNodeB) and the UTs. The EPC or Core Network (CN) includes the Mobility Management Entity (MME), Serving Gateway (SGW) and Packet Data Network (PDN) Gateway (PGW). The HSS comprises a database that contains user-related and subscriber-related information, and also provides support functions in mobility management, call and session setup, user authentication and access authorization. The SGW and PGW operate in connection with the User Plane, for example, transporting the IP user data traffic between the User Equipment (UE) and external networks (e.g., external data networks, such as IP or packet data networks). The SGW is the point of interconnect between the radio-side and the EPC, for example, serving the UE by routing incoming and outgoing IP packets. Further, the SGW is the anchor point for intra-LTE mobility (e.g., for handover between eNodeBs) and between LTE and other 3GPP accesses. The SGW is logically connected to the PGW. The PGW is the point of interconnect between the EPC and the external IP networks (Packet Data Networks). The PGW routes IP packets between the PDNs and the SGW. The PGW also performs various functions, such as IP address/IP prefix allocation or policy control and charging. While the 3GPP standards specify these gateways as being independent, in practice, the SGW and PGW may be combined. The MME operates in connection with the control plane, for example, managing the signaling related to mobility and security for E-UTRAN access. The MME is responsible for the tracking and the paging of UE in idle-mode, and is the termination point of the Non-Access Stratum (NAS). The 3GPP LTE network architecture was first described in detail in the Release 8 version of the 3GPP technical specifications, which is summarized in the 2009 Alcatel-Lucent white paper, "LTE Network Architecture, A Comprehensive Tutorial," which is incorporated by reference herein in its entirety.

The E-UTRAN (Evolved Universal Terrestrial Radio Access Network) performs the Radio Access Network (RAN) functions between the EPC and the UTs. In a 3GPP LTE network, the E-UTRAN consists of the various eNodeBs geographically dispersed throughout the network coverage area. As shown in FIG. 1, on the user plane level, the E-UTRAN (e.g., the eNodeB) interfaces with the SGW via the S1-U interface, and on the control plane level, the E-UTRAN (e.g., the eNodeB) interfaces with the MME via the S1-MME interface.

Figure 2:
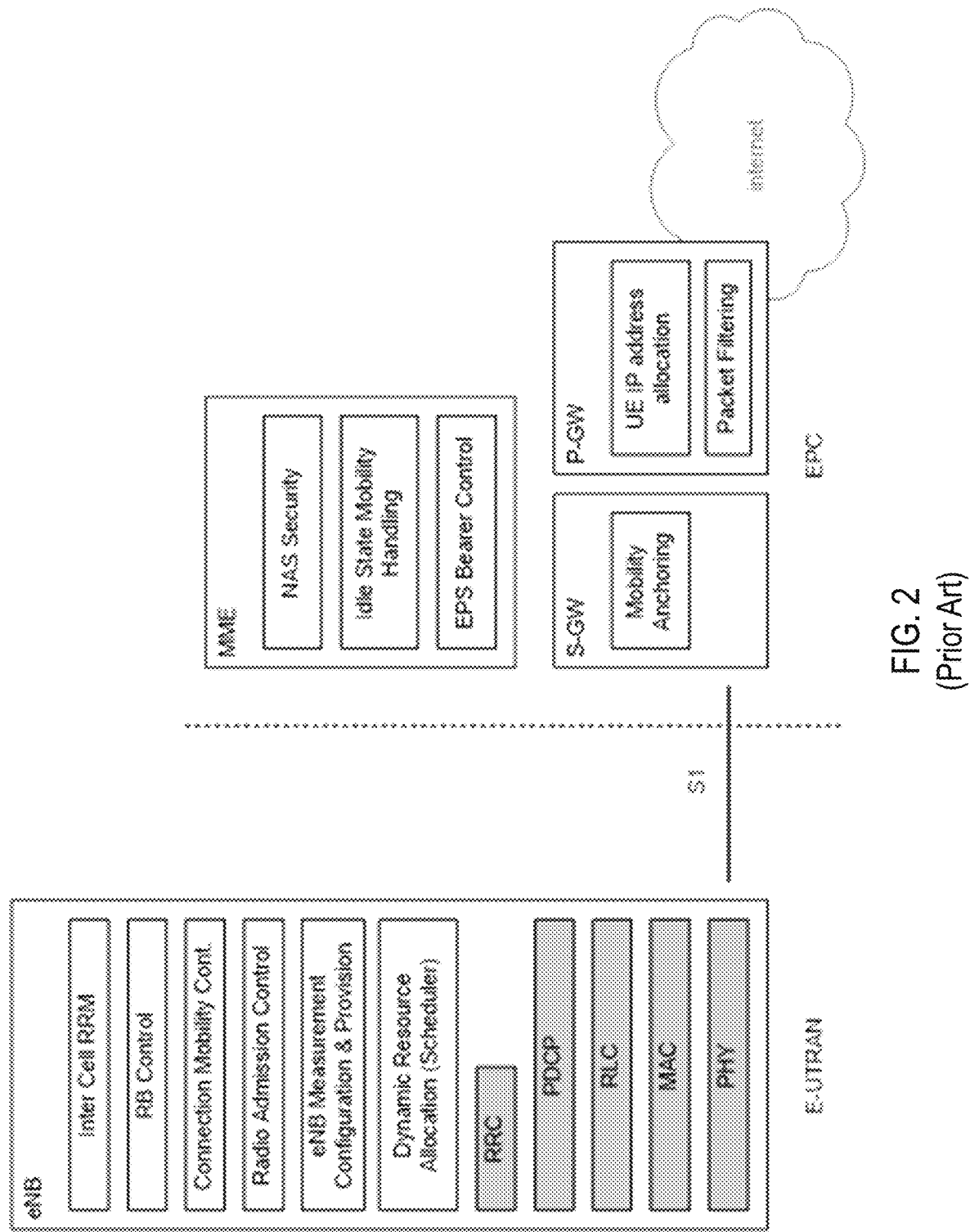
FIG. 2 shows the functional split (via the S1 interface) between the E-UTRAN and the EPC of a typical 3GPP LTE network.

FIG. 2 shows the functional split (via the S1 interface) between the E-UTRAN and the EPC of a typical 3GPP LTE network (FIG. 2 is from the above-referenced 3GPP technical specification TS 36.300). As provided in the specification TS 36.300, the eNodeB hosts the following functions:

Functions for Radio Resource Management: Radio Bearer Control, Radio Admission Control, Connection Mobility Control, Dynamic allocation of resources to UEs in uplink, downlink and sidelink (scheduling);

IP header compression and encryption of user data stream;

Selection of an MME at UE attachment when no routing to an MME can be determined from the information provided by the UE;

Routing of User Plane data towards Serving Gateway;

Scheduling and transmission of paging messages (originated from the MME);

Scheduling and transmission of broadcast information (originated from the MME or O&M);

Measurement and measurement reporting configuration for mobility and scheduling;

Scheduling and transmission of PWS (which includes ETWS and CMAS) messages (originated from the MME);

CSG handling;

Transport level packet marking in the uplink;

S-GW relocation without UE mobility, as defined in TS 23.401;

SIPTO@LN handling;

Maintaining security and radio configuration for User Plane CIoT EPS optimizations, as defined in TS 24.301;

Optionally registering with the X2 GW (if used).

As further provided in the specification TS 36.300, the MME hosts the following functions [see 3GPP TS 23.401]:

NAS signaling;

NAS signaling security;

AS Security control;

Selection of CIoT EPS optimizations (Control Plane CIoT EPS optimizations or User Plane CIoT EPS optimizations, as defined in TS 24.301);

Inter CN node signaling for mobility between 3GPP access networks;

Idle mode UE Reachability (including control and execution of paging retransmission);

Tracking Area list management (for UE in idle and active mode);

PDN GW and Serving GW selection;

MME selection for handovers with MME change;

SGSN selection for handovers to 2G or 3G 3GPP access networks;

Roaming;

Authentication;

Bearer management functions including dedicated bearer establishment;

Support for PWS (which includes ETWS and CMAS) message transmission;

Optionally performing paging optimization;

S-GW relocation without UE mobility, as defined in TS 23.401.

As further provided in the specification TS 36.300, the SGW hosts the following functions [see 3GPP TS 23.401]:

The local Mobility Anchor point for inter-eNB handover;

Mobility anchoring for inter-3GPP mobility;

E-UTRAN idle mode downlink packet buffering and initiation of network triggered service request procedure;

Lawful Interception;

Packet routing and forwarding;

Transport level packet marking in the uplink and the downlink;

Accounting on user and QCI granularity for inter-operator charging;

UL and DL charging per UE, PDN, and QCI.

Figure 3:
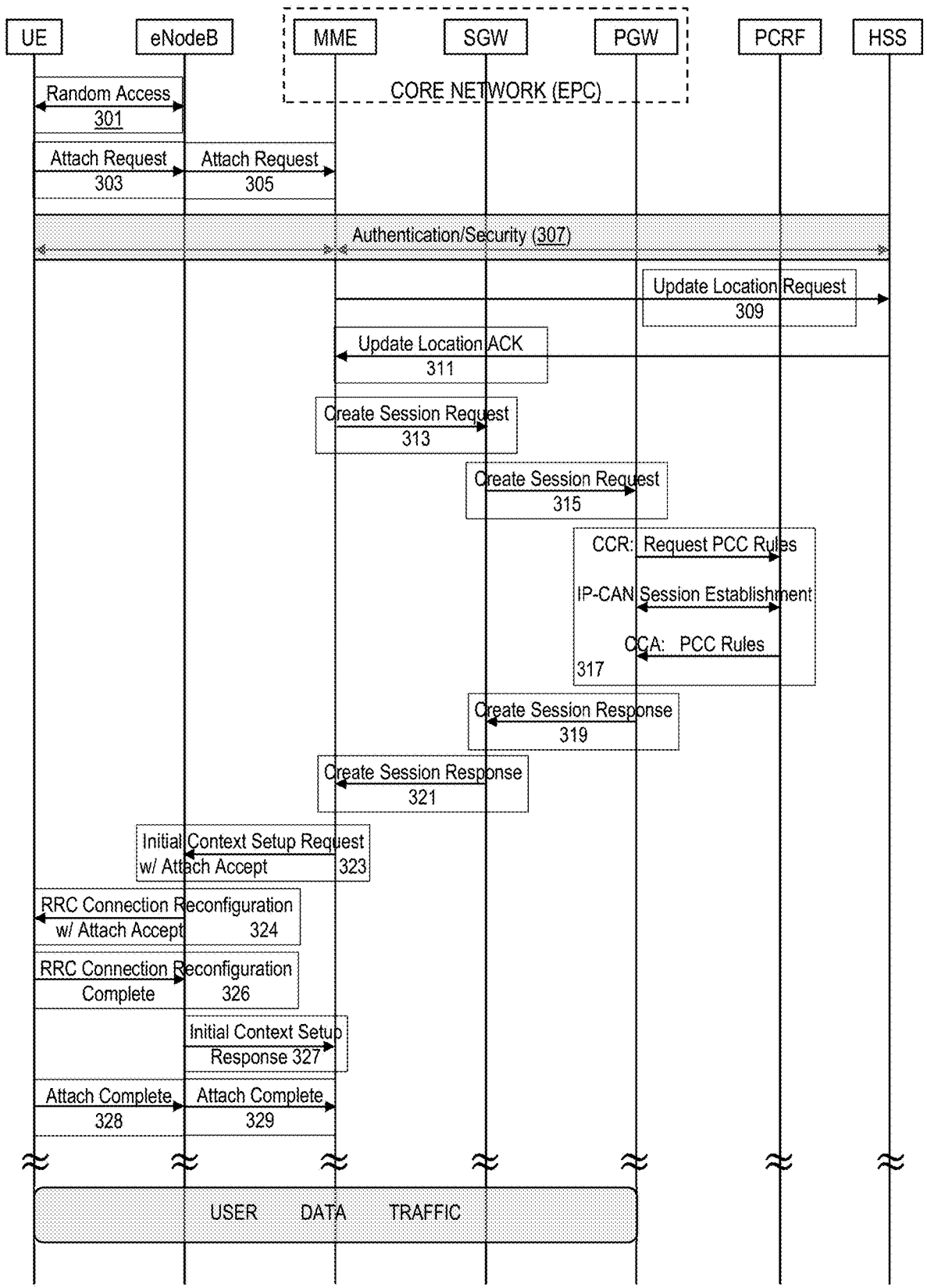
FIG. 3 illustrates an example of the UT registration process (attach process) of a typical LTE network.

As further provided in the specification TS 36.300, the PGW hosts the following functions [see 3GPP TS 23.401]:

Per-user based packet filtering (by e.g. deep packet inspection);

Lawful Interception;

UE IP address allocation;

Transport level packet marking in the uplink and the downlink;

UL and DL service level charging, gating and rate enforcement;

DL rate enforcement based on APN-AMBR;

FIG. 3 illustrates an example of the UT registration process (attach process) within a typical LTE network. A UT registers with the network to access the network services. Through the attach process, the parameters used to associate UT to the SP can be obtained by the eNodeB. The attach process, for example, is more fully described in the 3GPP Specification TS 23.401, Section 5.3.2.

Initially (e.g., upon power-on), at Step 301, the UE first selects a network based on the Public Land Mobile Network (PLMN) identifier stored in the subscriber identity module (SIM) card of the UE. The SIM card securely stores identification information (e.g., the international mobile subscriber identity (IMSI) number, PLMN and security key information) used to identify and authenticate the UE on the network. The PLMN identifies the operator network with which the UE holds a current subscription (e.g., Verizon, AT&T, T-Mobile, etc.). Each eNodeB broadcasts the PLMN for the respective network operator that owns/operates the eNodeB. Accordingly, at this point, via random access, the UE identifies the eNodeB for the network to which it subscribes based on a match between the PLMN stored in its SIM card and the PLMN broadcast by the appropriate eNodeB. Further, in a multi-operator core network sharing configuration, there may be multiple core networks, each with a respective unique PLMN ID associated with each eNodeB. When the UE registers with a core network, the UE sends the Attach Message to the eNodeB, which includes the selected network PLMN-ID (and the UE IMSI). The eNodeB extracts the PLMN-ID from the Attach Request, and connects the UE with the respective core network with which the PLMN-ID is associated.

Further, in order to access network resources or data services, the UE needs to register with the network to receive services that require registration (e.g., subscription services)—registration is referred to as Network Attachment. In LTE networks, the always-on IP connectivity for a UE of the Evolved Packet System (EPS) may be enabled by establishing a default EPS bearer during Network Attachment. The "default EPS bearer" or simply "default bearer" is the EPS bearer that is first established for a new PDN connection, and remains established throughout the lifetime of the PDN connection. The PCC rules applied to the default EPS bearer may be predefined in the PGW and activated in the attachment by the PGW itself. In the event that the UE subscribes to services that utilize specific dedicated bearers (other than the default bearer), the Attach procedure may further trigger one or multiple Dedicated Bearer Establishment procedures to establish the respective dedicated bearer(s) for that UE. During the attach procedure, the UE may also request for an IP address allocation.

Once the UE acquires the appropriate network, to initiate the Attach process, the UE first sends an Attach Request message to the eNodeB, which contains various parameters, including the UE IMSI and the PLMN identifier (Step 303). The eNodeB forwards the UE Attach Request to the MME (Step 305). When the MME receives the UE attach request message, the MME requests the authentication keys from HSS, and authenticates the UE based on the provided keys (Step 307). At this point, the MME also assigns a unique identifier for the UE (the MME-UE-S1AP-ID, which is used by the MME to uniquely identify UE over the S1 interface within the MME. The MME-UE-S1AP-ID remains valid and constant as long as the UE maintains the S1 connection with the MME. After successfully authenticating the UE, the MME sends an Update Location Request message to the HSS to indicate that the UE is now handled by that MME (Step 309), which contains various parameters, including the MME identity and UE IMSI. The HSS acknowledges the attachment by sending an Update Location ACK message (including the UE IMSI, and Subscription data) back to the MME (Step 311). The Subscription data contains one or more PDN subscription contexts, where each PDN subscription context contains an 'EPS subscribed QoS profile' (e.g., the subscribed QCI and ARP). The QCI being the QoS Class Identifier and the ARP being the Allocation and Retention Priority (which provides bearer priority and preemption information).

The MME then sends a Create Session Request message to the selected SGW (Step 313). The Create Session Request message of the MME includes various parameters, such as the UE IMSI and the Default EPS Bearer QoS. As provided in the 3GPP TS 23.401, the Create Session Request message of the MME may further include other parameters, such as MSISDN, MME TEID for control plane, PDN GW address, PDN Address, APN, RAT type, PDN Type, APN-AMBR, EPS Bearer Identity, Protocol Configuration Options, Handover Indication, ME Identity (IMEISV), User Location Information (ECGI), UE Time Zone, User CSG Information, MS Info Change Reporting support indication, Selection Mode, Charging Characteristics, Trace Reference, Trace Type, Trigger Id, OMC Identity, Maximum APN Restriction, Dual Address Bearer Flag, the Protocol Type over S5/S8, Serving Network. The SGW creates a respective new entry in its EPS Bearer table for the respective bearer and sends a Create Session Request message to the PGW (Step 315). The Create Session Request message of the SGW includes various parameters, such as the UE IMSI and the Default EPS Bearer QoS. As provided in the 3GPP TS 23.401, the Create Session Request message of the SGW may further include other parameters, such as MSISDN, APN, Serving GW Address for the user plane, Serving GW TEID of the user plane, Serving GW TEID of the control plane, RAT type, PDN Type, PDN Address, subscribed APN-AMBR, EPS Bearer Identity, Protocol Configuration Options, Handover Indication, ME Identity, User Location Information (ECGI), UE Time Zone, User CSG Information, MS Info Change Reporting support indication, PDN Charging Pause Support indication, Selection Mode, Charging Characteristics, Trace Reference, Trace Type, Trigger Id, OMC Identity, Maximum APN Restriction, Dual Address Bearer Flag, Serving Network.

In Step 317, the PGW requests PCC rules from PCRF by sending a Credit Control Request (CCR) message on the Gx interface to the PGW. The PGW also performs an IP-CAN Session Establishment procedure with the PCRF. [See 3GPP TS 23.203] The PCRF responds, providing the default PCC rules for the UE to the PGW via a Credit Control Answer (CCA) message on the Gx interface. This may lead to the establishment of a number of dedicated bearers (e.g., following the procedures defined in clause 5.4.1 in association with the establishment of the default bearer, which is described in Annex F). The PCRF may provision the authorized QoS (QCI and ARP) for the default EPS bearer. The authorized QoS may be obtained upon interaction between PCRF and SPR. [See 3GPP TS 29.212] Further, the QoS parameters (QCI and ARP) and other parameters of the EPS bearer associated with default bearer obtained from HSS may be modified by the PCRF. [See 3GPP TS 23.401] The PCRF sends Default-EPS-Bearer-QoS AVP (QCI and ARP) to the PCRF (i.e., PGW), to indicate the authorized QoS for the default EPS bearer. [See 3GPP TS 23.401] The PGW creates a new entry in its EPS bearer context table and generates a Charging Id for the Default Bearer, which allows the PGW to route user plane data packets between the SGW and the packet data network, and to start charging.

The PGW then sends a Create Session Response message to the SGW (Step 319). The Create Session Response message of the PGW includes various parameters, such as the EPS Bearer QoS. As provided in the 3GPP TS 23.401, the Create Session Request message of the PGW may further include other parameters, such as PDN GW Address for the user plane, PDN GW TEID of the user plane, PDN GW TEID of the control plane, PDN Type, PDN Address, EPS Bearer Identity, Protocol Configuration Options, Charging Id, Prohibit Payload Compression, APN Restriction, Cause, MS Info Change Reporting Action (Start) (if the PDN GW decides to receive UE's location information during the session), CSG Information Reporting Action (Start) (if the PDN GW decides to receive UE's User CSG information during the session), Presence Reporting Area Action (if the PDN GW decides to receive notifications about a change of UE presence in Presence Reporting Area), PDN Charging Pause Enabled indication (if PDN GW has chosen to enable the function), APN-AMBR, Delay Tolerant Connection. The EPS Bearer QoS profile provides the QCI and ARP. The SGW sends a Create Session Response message to the MME (Step 321), including the EPS Bearer QoS profile (QCI and ARP), the UE IP Address and the SGW GTP-u TEID. As provided in the 3GPP TS 23.401, the Create Session Response message of the SGW may further include other parameters, such as PDN Type, PDN Address, Serving GW address for User Plane, Serving GW TEID for S1-U User Plane, Serving GW TEID for control plane, EPS Bearer Identity, PDN GW addresses and TEIDs (GTP-based S5/S8) or GRE keys (PMIP-based S5/S8) at the PDN GW(s) for uplink traffic, Protocol Configuration Options, Prohibit Payload Compression, APN Restriction, Cause, MS Info Change Reporting Action (Start), Presence Reporting Area Action, CSG Information Reporting Action (Start), APN-AM BR, Delay Tolerant Connection.

The MME then sends an Initial Context Setup Request message, with an Attach Accept message, to the eNodeB (Step 323). The Attach Accept message includes various parameters, including the EPS Bearer QoS, and the Initial Context Setup Request message includes various parameters, including the EPS Bearer QoS, the MME-UE-S1AP-ID and the SGW-TEID. As provided in the 3GPP TS 23.401, the Attach Accept message may further include other parameters, such as GUTI, TAI List, Session Management Request (APN, PDN Type, PDN Address, EPS Bearer Identity, Protocol Configuration Options, Header Compression Configuration, Control Plane Only Indicator), NAS sequence number, NAS-MAC, IMS Voice over PS session supported Indication, Emergency Service Support indicator, LCS Support Indication, Supported Network Behaviour. Also, as provided in the 3GPP TS 23.401, the Initial Context Setup Request message may further include other parameters, such as CIoT EPS optimisations it accepts in the Supported Network Behaviour information, the AS security context information for the UE, the Handover Restriction List, the EPS Bearer QoS, the UE-AMBR, EPS Bearer Identity, as well as the TEID at the Serving GW used for user plane and the address of the Serving GW for user plane and whether User Plane CIoT EPS Optimisation is allowed for the UE. The eNodeB sends an RRC Connection Reconfiguration message (including the EPS Radio Bearer Identity) to the UE, along with the Attach Accept message (Step 324), which includes the EPS Bearer QoS. The UE responds with an RRC Connection Reconfiguration Complete message back to the ENodeB (Step 326). The eNodeB in turn sends an Initial Context Setup Response message back to the MME (Step 327), which includes the TEID of the eNodeB and the address of the eNodeB used for downlink traffic on the S1_U reference point. Further, the UE sends a Direct Transfer message to the eNodeB (Step 328), which includes the Attach Complete message (EPS Bearer Identity, NAS sequence number, NAS-MAC). The eNodeB then forwards sends an Attach Complete message to the MME (Step 329).

UE-SP Association Based on QCI

Figure 4:
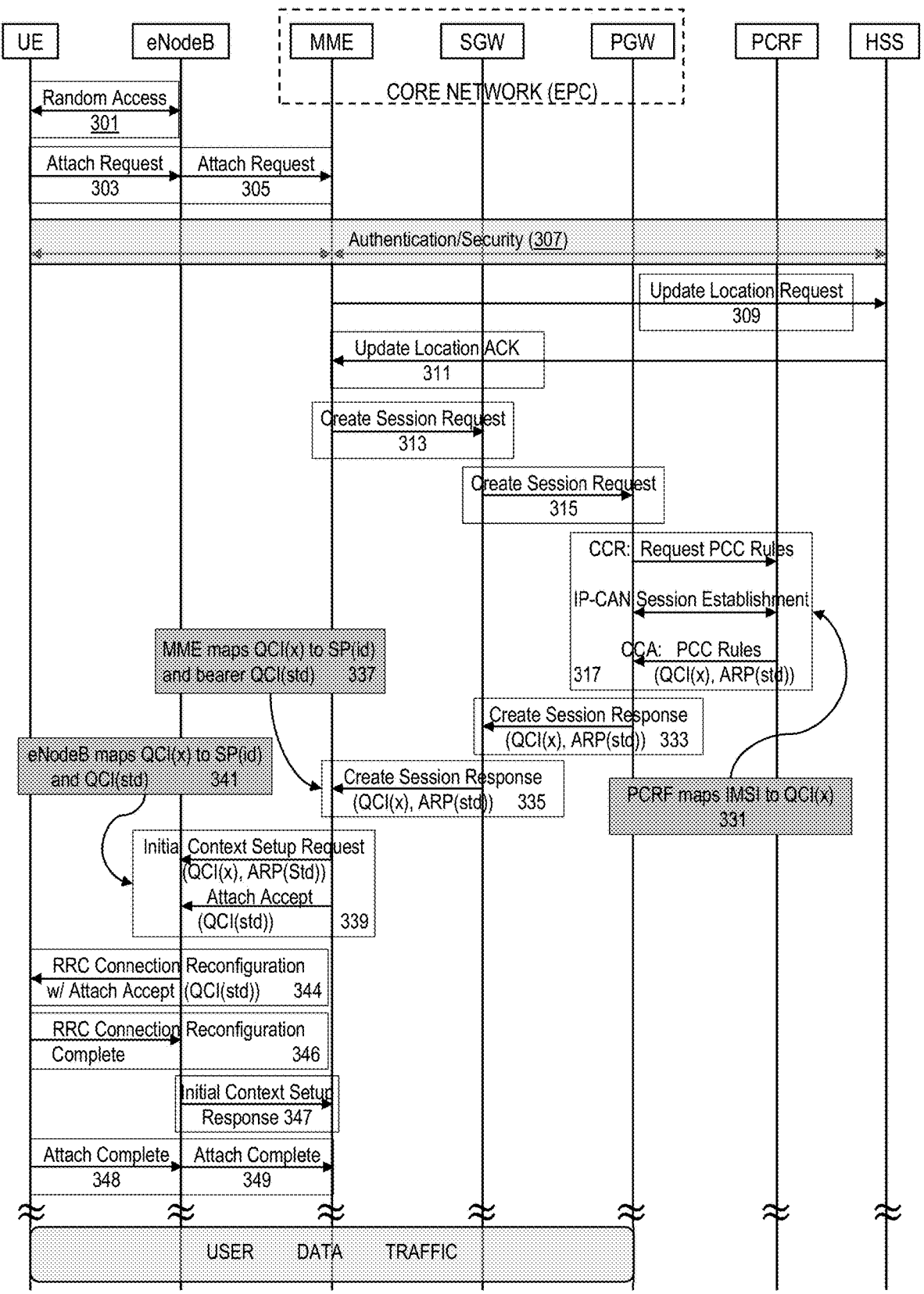
FIG. 4 illustrates a messaging or signaling flow diagram depicting an example approach for UT-SP association, during the initial UT attach process (within an LTE network), based on the QoS Class Identifier (QCI), according to example embodiments of the present invention.

FIG. 4 illustrates a messaging or signaling flow diagram depicting an example approach for UE-SP association, during the initial UE attach process (e.g., within an LTE network), based on the QoS Class Identifier (QCI), according to example embodiments of the present invention.

QoS Class Identifier (QCI) is a mechanism used in 3GPP LTE networks to ensure that bearer traffic is allocated appropriate QoS. Different bearer traffic requires different QoS, and thus different QCI values. The QCI parameter is used to ensure that bearer traffic in LTE networks is communicated by a bearer of appropriate QoS characteristics—the different bearers are categorized in different classes, with each class having appropriate QoS parameters for the respective traffic type. Examples of the QoS parameters include Guaranteed Bit Rate (GBR) or non-Guaranteed Bit Rate (non-GBR), Priority Handling, Packet Delay Budget and Packet Error Loss rate. The overall QoS mechanism is called QCI. Table 2 (below) illustrates the Standardized QCI values and associated QoS characteristics. [See 3GPP TS 23.203]

TABLE 1

Standard QCI Characteristics [See 3GPP TS 23.203]

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice. |
| 2 | | 4 | 150 ms | $10^{-3}$ | Conversational Video (Live Streaming). |
| 3 | | 3 | 50 ms | $10^{-3}$ | Real Time Gaming. |
| 4 | | 5 | 300 ms | $10^{-6}$ | Non-Conversational Video (Buffered Streaming). |
| 65 | | 0.7 | 75 ms | $10^{-2}$ | Mission Critical user plane Push To Talk voice (e.g., MCPTT). |
| 66 | | 2 | 100 ms | $10^{-2}$ | Non-Mission-Critical user plane Push To Talk voice. |
| 75 | | 2.5 | 50 ms | $10^{-2}$ | V2X messages. |
| 5 | Non-GBR | 1 | 100 ms | $10^{-6}$ | IMS Signaling. |
| 6 | | 6 | 300 ms | $10^{-6}$ | Video (Buffered Streaming) TCP-based (e.g., www, e-mail, chat, ftp, p2p file sharing, progressive video, etc.). |
| 7 | | 7 | 100 ms | $10^{-3}$ | Voice, Video (Live Streaming) Interactive Gaming. |
| 8 | | 8 | 300 ms | $10^{-6}$ | Video (Buffered Streaming) TCP-based (e.g., www, e-mail, chat, ftp, p2p file sharing, progressive video, etc.). |
| 9 | | 9 | 300 ms | $10^{-6}$ | Video (Buffered Streaming) TCP-Based (e.g., www, email, chat, ftp, p2p ftp, p2p file sharing, progressive video, etc.). Typically used as default bearer. |
| 69 | | 0.5 | 60 ms | $10^{-6}$ | Mission Critical delay sensitive signaling (e.g., MCPTT signaling) |
| 70 | | 5.5 | 200 ms | $10^{-6}$ | Mission Critical Data (e.g. example services are the same as QCI 6/8/9) |
| 79 | | 6.5 | 50 ms | $10^{-2}$ | V2X messages |

According to example embodiments for such a QCI-based approach for UE-SP association, a UE is first mapped to a respective predetermined QCI identifier based on the IMSI of the UE, and each such QCI identifier is subsequently mapped to a respective service provider identifier and standardized QCI value—for purposes hereof, the Standardized QCI indicators shall be referred to as QCI(std), the predetermined QCI indicators shall be referred to as QCI(x), and the service provider identifiers shall be referred to as SP(id). According to one such embodiment, the PCRF will have a QCI mapping table or database that maps the IMSI of each subscriber UE to a respective QCI(x). Note that multiple UEs (e.g., multiple different IMSIs) can be associated with the same QCI(x). For example, Table 2 (below) illustrates and example of such an IMSI mapping table. Further, the MME and eNodeBs also host a mapping table that maps each QCI(x) to a respective service provide identifier SP(id) and respective standardized QCI identifier QCI(std). Table 3 (below) illustrates and example of such a QCI(x) mapping table. By way of example, the QCI-based UE-SP mapping is determined and configured between the MME and the eNodeB. In the examples of Tables 2 and 3, the QCI(x) values are in the operator-specific QCI range (e.g., 128 to 254) [See 3GPP TS 29.212]. Accordingly, with reference to Table 2, the UEs with IMSIs A, C, D are mapped to the QCI(x)=218, the UEs with IMSIs B, E are mapped to the QCI(x)=219, etc. Further, with reference to Table 3, the UEs with IMSIs A, C, D (QCI(x)=218) are associated with the service provider SP(1) and the QCI(std)=8, the UEs with IMSIs B, E (QCI(x)=219) are associated with the service provider SP(1) and the QCI(std)=9, etc.

TABLE 2

IMSI Mapping to QCI(x)

| IMSI | QCI(x) |
|---|---|
| A | 218 |
| B | 219 |
| C | 218 |
| D | 218 |
| E | 219 |
| F | 222 |
| G | 222 |
| ... | ... |

TABLE 3

QCI(x) Mapping to SP(id) and QCI(std)

| QCI(x) | SP(id) | QCI(std) |
|---|---|---|
| 218 | 1 | 8 |
| 219 | 1 | 9 |
| 221 | 2 | 8 |
| 222 | 2 | 9 |
| 230 | 3 | 7 |
| 231 | 3 | 8 |
| ... | ... | ... |

As provided above (with reference to the Attach process of FIG. 3), and with reference now to FIG. 4, when establishing the default bearer for a UT as part of the attach procedure, once the authentication and security procedures is completed (Step 307), and the Update Location Request/ACK messages are exchanged between the MME and the HSS (Steps 309-311), the Create Session Request message is sent from the MME to the SGW (Step 313) and from the SGW to the PGW (Step 315), which provides the UE IMSI and the default bearer QoS. When the PCRF receives the CCR request message from the PGW (Step 317), which includes the UE IMSI and the bearer QoS, the PCRF maps the UE (based on its IMSI) to the respective QCI(x) from the IMSI-QCI(x) mapping table (Step 331), and the PCRF provides the respective QCI(x) to the PGW via the CCA response message providing the PCC Rules to the PGW.

The Create Session Response messages sent from the PGW to SGW (Step 333), and sent from the SGW to the MME (Step 335), provide the respective QCI(x) (mapped by the PCRF) to the MME. The MME now extracts the QCI(x) from the Create Session Response message, and maps the QCI(x) back to the respective SP(id) and bearer QCI(std) for the UE (Step 337)—based on the QCI(x) Mapping to SP(id) and QCI(std) Table hosted by the MME. Further, the MME includes the QCI(x) identifier in the Initial Context Setup Request message, and includes the QCI(std) identifier in the Attach Accept message, both sent to the eNodeB (Step 339). From the QCI(x) identifier included in the Initial Context Setup Request message, the eNodeB maps the QCI(x) to the SP(id) to identify the respective SP for the UE (Step 341)—based on the QCI(x) Mapping to SP(id) and QCI(std) Table hosted by the eNodeB. Now, with the identification of the respective SP of the UE, the eNodeB and can manage the resources for the UE based on the particular SP subscriptions with the network operator. Further, the Attach Accept message sent by the eNodeB to the UE includes the QCI(std) identifier (Step 344), and the UE can thereby configure the RRC Session for the appropriate standardized QoS characteristics. The UE responds with an RRC Connection Reconfiguration Complete message back to the eNodeB (Step 346). The eNodeB in turn sends an Initial Context Setup Response message back to the MME (Step 347). Further, the UE sends an Attach Complete message to the eNodeB (Step 348) and by the eNodeB sends an Attach Complete message to the MME (Step 349).

Further, in the 3GPP standard, QCI is used solely for QoS characteristic mapping. According to example embodiments, additional E-RAB SETUP REQUEST can use the operator specific QCI mapping that provides the SP and the standardized QCI value or they can rely on the standardized QCI value as the UE-SP association has already been established at the default bearer setup.

UE-SP Association Based on Allocation and Retention Priority (ARP) Field

Figure 5:
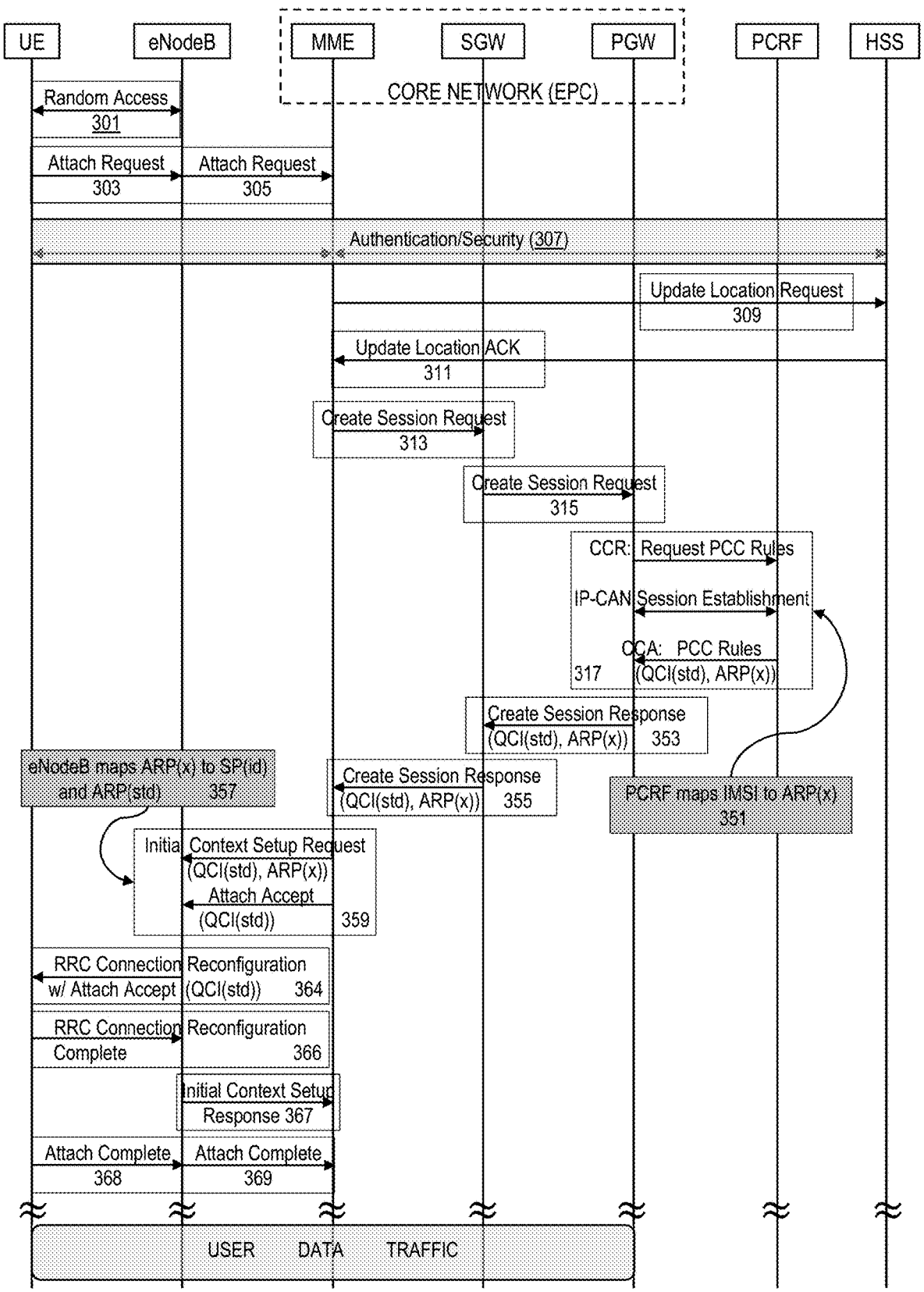
FIG. 5 illustrates a messaging or signaling flow diagram depicting an example approach for UT-SP association, during the initial UT attach process (within an LTE network), based on the Allocation and Retention Priority (ARP) indicator, according to example embodiments of the present invention.

FIG. 5 illustrates a messaging or signaling flow diagram depicting an example approach for UE-SP association, during the initial UE attach process (e.g., within an LTE network), based on the Allocation and Retention Priority (ARP) indicator, according to example embodiments of the present invention. According to such example embodiments, ARP is a parameter that can also convey the association of a UE with the respective SP from the MME to eNodeB. By way of example, the ARP-based UE-SP mapping is determined and configured between the PCRF and the eNodeB. By way of example, similar to the QCI-based approach, the PCRF will have an ARP mapping table or database that maps the IMSI of each subscriber UE to a respective predefined ARP used for purposes of the UE-SP association. A UE is first mapped to a respective predetermined ARP identifier based on the IMSI of the UE, and each such ARP identifier is then mapped to a respective service provider identifier and standardized ARP value—for purposes hereof, the Standardized ARP indicators shall be referred to as ARP(std), the predetermined ARP indicators shall be referred to as ARP(x), and the service provider identifiers shall be referred to as SP(id). Again, multiple UEs (e.g., multiple different IMSIs) can be associated with the same ARP. For example, Table 4 (below) illustrates and example of such an IMSI mapping table. Further, the eNodeBs host a mapping table or database that maps each ARP(x) to a respective service provide identifier SP(id) and respective standardized ARP identifier ARP(std)—in the case of the ARP-based UE-SP association, only the eNodeB is required to host a mapping table, and not the MME also. Table 5 (below) illustrates and example of such an ARP(x) mapping table. Accordingly, with reference to Table 4, the UEs with IMSIs A, D, G are mapped to the ARP(x)=1, the UEs with IMSIs B, F are mapped to the ARP(x)=2, etc. Further, with reference to Table 5, the UEs with IMSIs A, D, G (ARP(x)=1) are associated with the service provider SP(1) and the ARP(std)=1, the UEs with IMSIs B, F (ARP(x)=2) are associated with the service provider SP(1) and the ARP(std)=3, etc.

TABLE 4

IMSI Mapping to ARP(x)

| IMSI | ARP(x) |
|---|---|
| A | 1 |
| B | 2 |

TABLE 4-continued

IMSI Mapping to ARP(x)

| IMSI | ARP(x) |
|---|---|
| C | 3 |
| D | 1 |
| E | 3 |
| F | 2 |
| G | 1 |
| ... | ... |

TABLE 5

ARP(x) Mapping to SP(id) and ARP(std)

| ARP(x) | SP(id) | ARP(std) |
|---|---|---|
| 1 | 1 | 1 |
| 2 | 1 | 3 |
| 3 | 2 | 3 |
| 4 | 2 | 2 |
| 5 | 3 | 2 |
| ... | ... | ... |
| 15 | 5 | 3 |

Again, as provided above (with reference to the Attach process of FIG. 3), and with reference now to FIG. 5, when establishing the default bearer for a UT as part of the attach procedure, once the authentication and security procedures is completed (Step 307), and the Update Location Request/ACK messages are exchanged between the MME and the HSS (Steps 309-311), the Create Session Request message is sent from the MME to the SGW (Step 313) and from the SGW to the PGW (Step 315), which provides the UE IMSI and the default bearer QoS. When the PCRF receives the CCR request message from the PGW (Step 317), which includes the UE IMSI and the bearer QoS, the PCRF maps the UE (based on its IMSI) to the respective ARP(x) from the IMSI-ARP(x) mapping table (Step 351), and the PCRF provides the respective ARP(x) to the PGW via the CCA response message providing the PCC Rules to the PGW. In this example, the standard QCI values may be used throughout the process, as specified in the respective 3GPP technical specifications.

The Create Session Response messages sent from the PGW to SGW (Step 353), and sent from the SGW to the MME (Step 355), provide the respective ARP(x) (mapped by the PCRF) to the MME. The MME includes the QCI(std) identifier and the ARP(x) identifier in the Initial Context Setup Request message, and includes the QCI(std) identifier in the Attach Accept message, both sent to the eNodeB (Step 359). The eNodeB MME now extracts the ARP(x) from the Initial Context Setup Request message, and maps the ARP (x) back to the respective SP(id) and bearer ARP(std) for the UE (Step 357)—based on the ARP(x) Mapping to SP(id) and ARP(std) Table hosted by the eNodeB. Now, again, with the identification of the respective SP of the UE, the eNodeB and can manage the resources for the UE based on the particular SP subscriptions with the network operator. Further, the Attach Accept message sent by the eNodeB to the UE includes the QCI(std) identifier (Step 364), and the UE can thereby configure the RRC Session for the appropriate standardized QoS characteristics. The UE responds with an RRC Connection Reconfiguration Complete message back to the ENodeB (Step 366). The eNodeB in turn sends an Initial Context Setup Response message back to the MME (Step 367). Further, the UE sends an Attach Complete message to the eNodeB (Step 368) and by the eNodeB sends an Attach Complete message to the MME (Step 369).

The HSS and/or PCRF will have the IMSI to Service Provider mapping. Hence there will be a slight change in HSS, or PCRF or both to accommodate this method.

UE-SP Association Based on MME-UE-S1AP-ID

Figure 6:
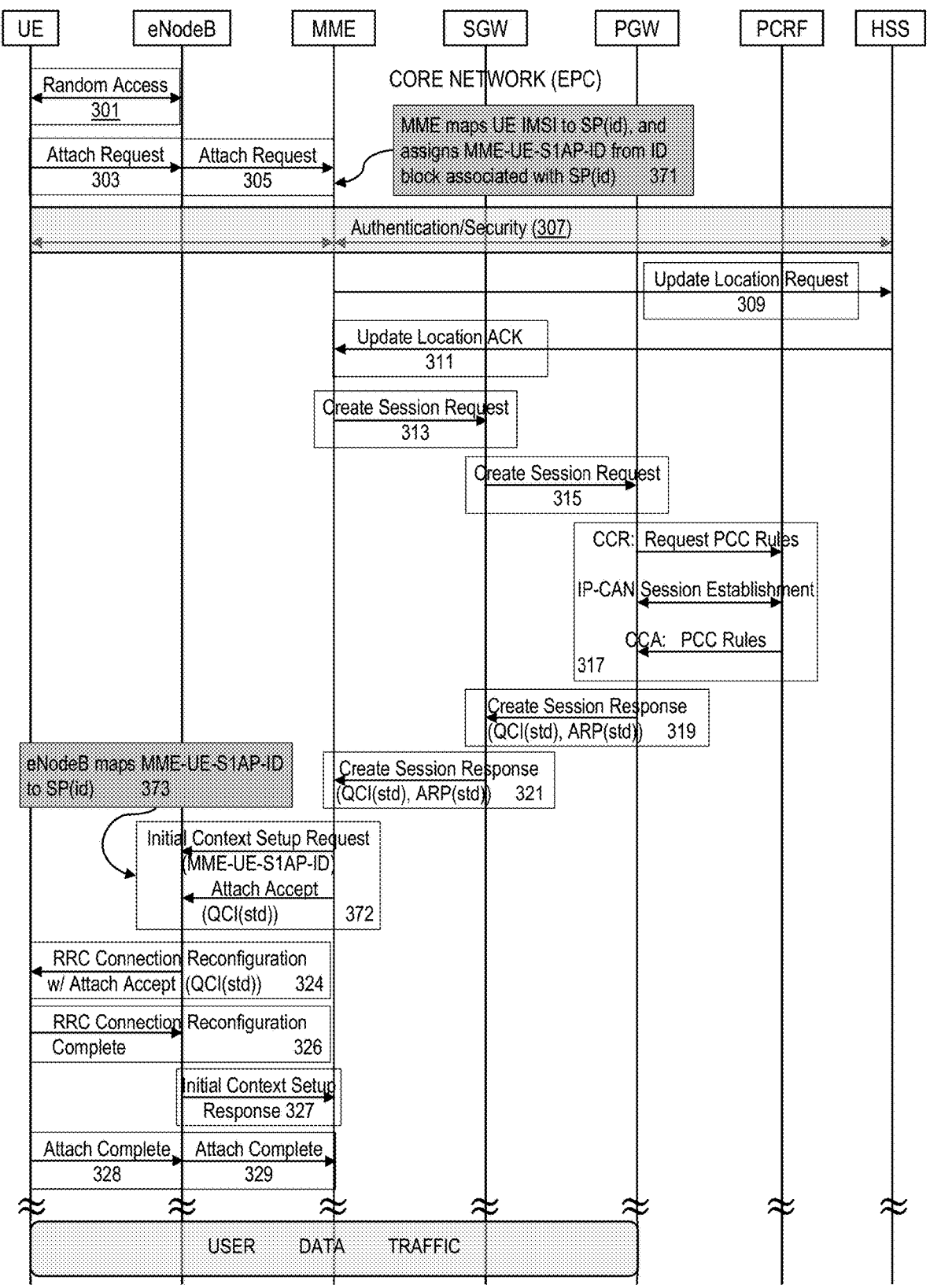
FIG. 6 illustrates a messaging or signaling flow diagram depicting an example approach for UT-SP association, during the initial UT attach process (e.g., within an LTE network), based on the MME-generated UT identifier (MME-UE-S1AP-ID), according to example embodiments of the present invention.

FIG. 6 illustrates a messaging or signaling flow diagram depicting an example approach for UE-SP association, during the initial UE attach process (e.g., within an LTE network), based on the MME-generated UE identifier (MME-UE-S1AP-ID), according to example embodiments of the present invention. In an LTE network (as provided above), the MME-UE-S1AP-ID is a unique identifier assigned and used by the MME to uniquely identify UE over the S1 interface within the MME (the MME-UE-S1AP-ID remains valid and constant as long as the UE maintains the S1 connection with the MME). In that context, according to example embodiments for such an MME-UE-S1AP-ID-based approach for UE-SP association, a UE is assigned a respective MME-UE-S1AP-ID based on the service provider of the UE, where the SP is determined based on the UE IMSI. The MME will be configured with an IMSI to SP mapping in order to assign an appropriate MME-UE-S1AP-ID—for example, the MME may be provided with a mapping table that maps the IMSI of each subscriber UE to a respective service provider identifier SP(id). The MME-UE-S1AP-ID, which, for example, may be integer from 0 to $2^{32}-1$, is used to map each UE to its respective SP. By way of example, the MME-UE-S1AP-ID-based UE-SP mapping is determined and configured between the MME and the eNodeB. An example mapping is shown in Table 6 (below), where a block of MME-UE-S1AP-IDs is allocated to each SP(id).

TABLE 6

MME-UE-S1AP-ID Mapping to SP(id)

| MME-UE-S1AP-ID | SP(id) |
|---|---|
| 0, . . . , a | 1 |
| a + 1, . . . , b, b > a + 1 | 2 |
| . . . | . . . |
| n − c, . . . , n, n − c > b + 1, n > c | n |

According to an example embodiment of the MME-UE-S1AP-ID-based UE-SP association, with reference to FIG. 6, after the MME receives the Attach Request message from the eNodeB (Step 305), the MME determines the SP identity SP(id) of the UE based on the UE IMSI, and assigns an unused MME-UE-S1AP-ID from the block of IDs mapped to (or associated with) the determined SP (Step 371)—for example, the MME may assign the next unused MME-UE-S1AP-ID within the respective block of IDs. Subsequently, at the point in time when the MME generates the Initial Context Setup Request message, the MME includes the MME-UE-S1AP-ID in the message and sends it to the eNodeB (Step 372). The eNodeB then maps the UE to its respective SP based on the MME-UE-S1AP-ID included in the Initial Context Setup Request message and a copy of the MME-UE-S1AP-ID Mapping to SP(id) table hosted by the eNodeB (Step 373). With the identification of the respective SP of the UE, the eNodeB and can manage the resources for the UE based on the particular SP subscriptions with the network operator.

This embodiment may require minor modifications to the standard operation of the MME with regard to the generation of the MME-UE-S1AP-ID (associating the ID with the respective SP of the UE).

UE-SP Association Based on GTP-U TEID

Figure 7:
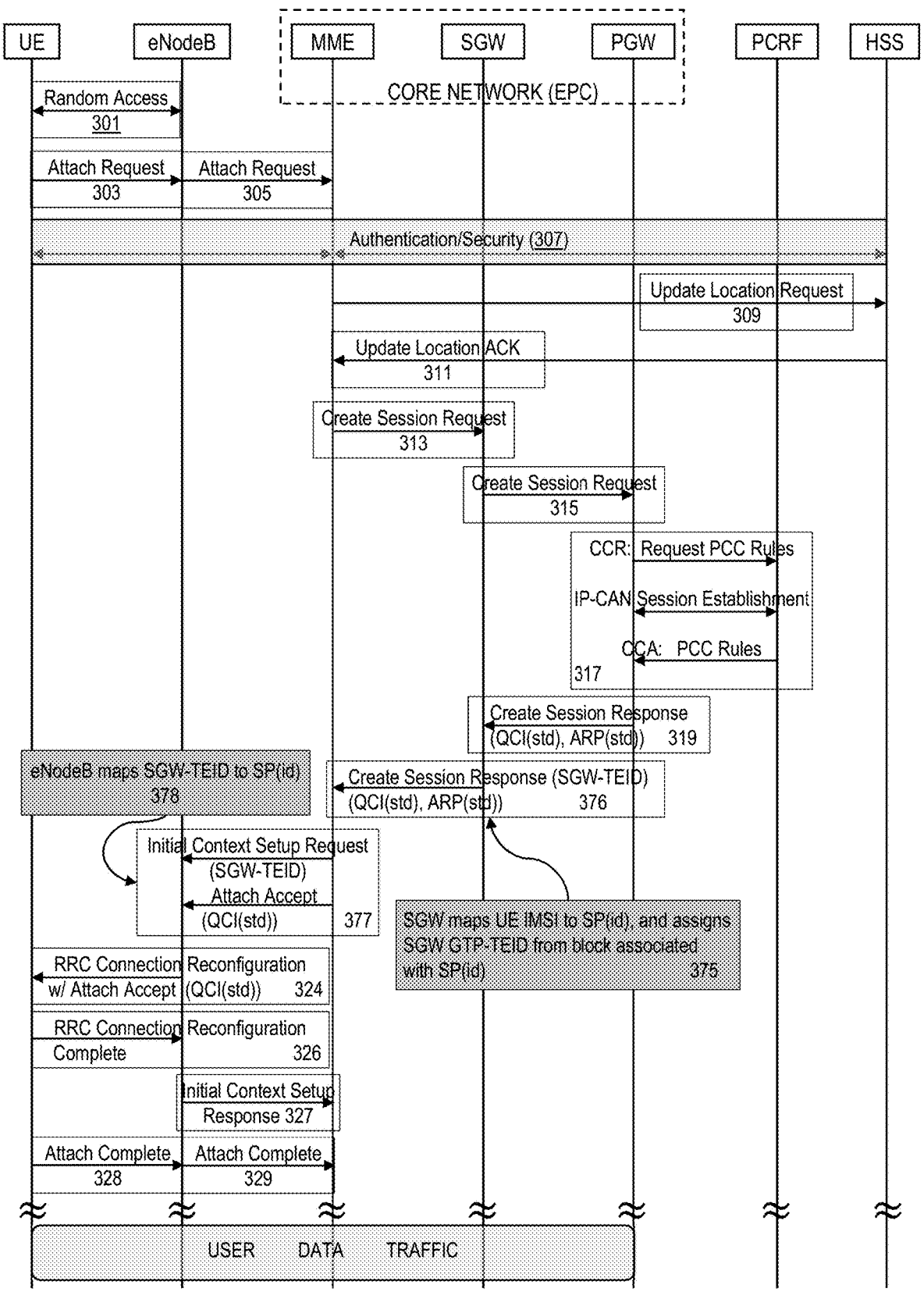
FIG. 7 illustrates a messaging or signaling flow diagram depicting an example approach for UE-SP association, during the initial UE attach process (e.g., within an LTE network), based on an assigned SGW TEID for the S1-U User Plane, according to example embodiments of the present invention.

FIG. 7 illustrates a messaging or signaling flow diagram depicting an example approach for UE-SP association, during the initial UE attach process (e.g., within an LTE network), based on an assigned SGW TEID for the S1-U User Plane, according to example embodiments of the present invention. According to such example embodiments, the SGW TEID for the S1-U User Plane is used to associate each UE with its respective SP. According to one such embodiment, when SGW receives Create Session Response from the PGW (Step 319), it sends a Create Session Response message to the SGW. The Create Session Response message contains various parameters, including SGW GTP-TEID for S1-U User Plane, SGW GTP-TEID for control plane, EPS Bearer Identity, EPS Bearer QoS, PDN GW addresses and TEIDs (GTP-based S5/S8), and others. For example, the SGW GTP-TEID for S1-U is a four byte number that will be used by the eNodeB to tunnel the uplink data from the UE to the SGW (via a GTP tunnel). General Packet Radio Service (GPRS) Tunneling Protocol (GTP) is a group of IP-based communications protocols used to carry General Packet Radio Service data (GPRS) within GSM, UMTS and LTE networks. Further, LTE networks generally employ GTP to transport user data packets over the mobile backhaul between the base stations (eNodeBs) and the core network elements. According to the present embodiment, in order to provide differentiated QoS based on the GTP-u TEID, the SGW will allocate a block of TEIDs for each SP(id) (e.g., each SP will have a different block of possible SGW TEID values). The SGW GTP-TEID is used to map each UE to its respective SP. By way of example, the SGW GTP-TEID-based UE-SP mapping is determined and configured between the SGW and the eNodeB. An example mapping is shown in Table 7 (below), where a block of SGW GTP-TEIDs is allocated to each SP(id).

TABLE 7

SGW GTP-TEID Mapping to SP(id)

| SGW GTP-TEID | SP(id) |
|---|---|
| 0, . . . , a | 1 |
| a + 1, . . . , b, b > a + 1 | 2 |
| . . . | . . . |
| n − c, . . . , n, n − c > b + 1, n > c | n |

In further accordance with the present embodiment, with reference again to FIG. 7, after the SGW receives the Create Session Response message from the PGW (Step 319), the SGW assigns a unique SGW GTP-TEID from the block of SGW GTP-TEID values allocated to the SP of the UE—the SGW determines the SP identity SP(id) of the UE based on the UE IMSI (Step 375). The SGW then sends a Create Session Response message to the MME, including the SGW GTP-TEID (Step 376). Then, the MME includes the SGW GTP-TEID in the Initial Context Setup Request message to the eNodeB (Step 377). The eNodeB then maps the UE to its respective SP based on the SGW GTP-TEID included in the Initial Context Setup Request message and a copy of the SGW GTP-TEID Mapping to SP(id) table hosted by the eNodeB (Step 378). Again, with the identification of the respective SP of the UE, the eNodeB and can manage the resources for the UE based on the particular SP subscriptions with the network operator.

This embodiment may require minor modifications to the standard operation of the SGW with regard to the generation of the SGW GTP-TEID for a tunnel used to carry traffic of a particular UE (modifications regarding the association of the GTP-TEID with the respective SP of the UE).

UE-SP Association Based on IP Address

Figure 8:
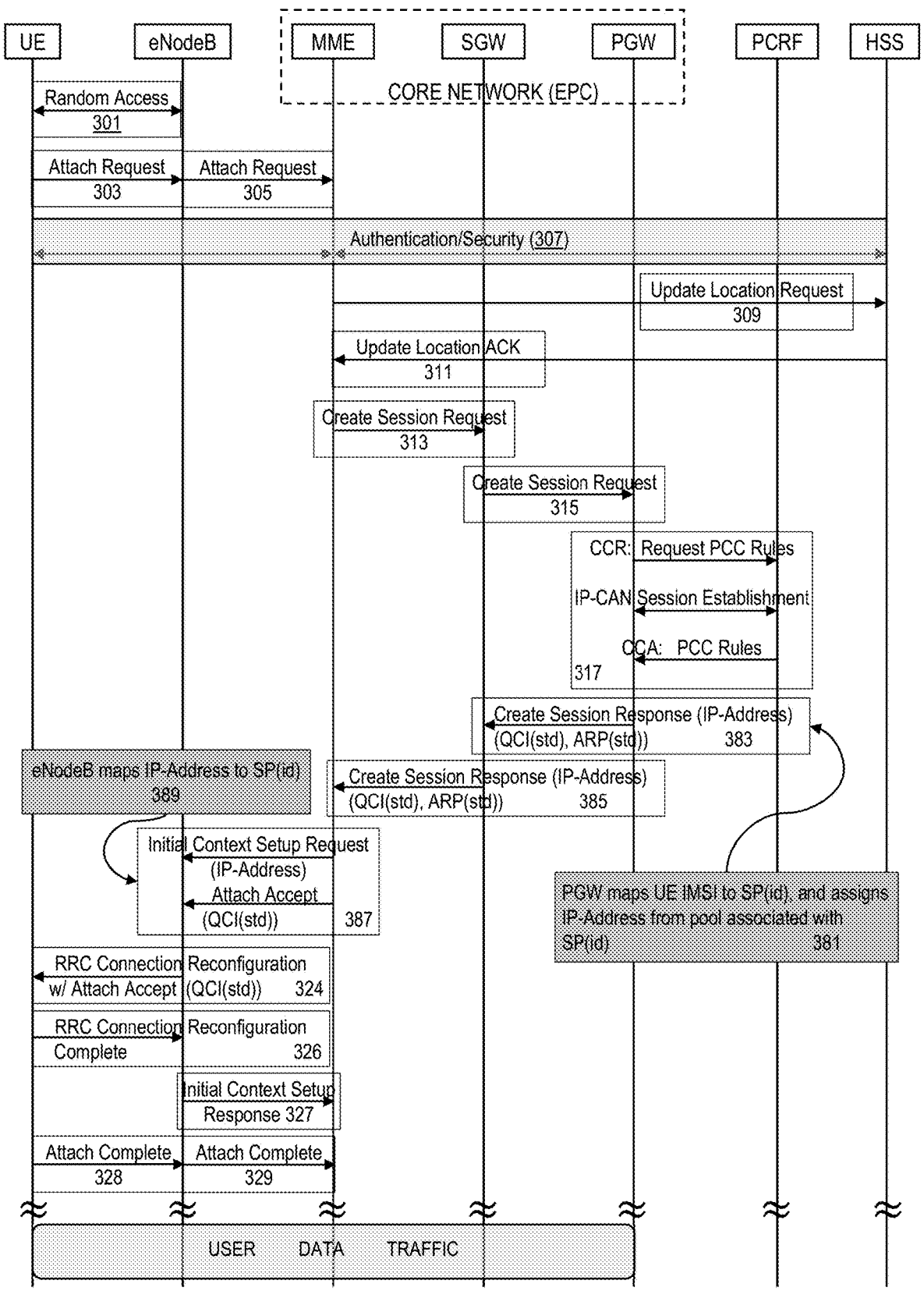
FIG. 8 illustrates a messaging or signaling flow diagram depicting an example approach for UE-SP association, during the initial UE attach process (e.g., within an LTE network), based on an assigned UE IP Address, according to example embodiments of the present invention.

FIG. 8 illustrates a messaging or signaling flow diagram depicting an example approach for UE-SP association, during the initial UE attach process (e.g., within an LTE network), based on an assigned UE IP Address, according to example embodiments of the present invention. According to such example embodiments, a unique block or pool of IP addresses is associated with or assigned to each service provider, and each UE is assigned an IP Address drawn from the pool of IP addresses allocated to the respective SP of the UE. The assigned IP Address is used to map each UE to its respective SP, and remains valid as long as UE is still attached to the PGW that assigned the IP address. By way of example, the IP-Address-based UE-SP mapping is determined and configured between the PGW and the eNodeB. An example mapping is shown in Table 8 (below), where a block of UE IP Addresses is allocated to each SP(id).

TABLE 8

IP-Address Mapping to SP(id)

| UE IP Address Pool | SP(id) |
|---|---|
| Pool A | 1 |
| Pool B | 2 |
| ... | ... |
| Pool N | n |

According to one such embodiment, after the PGW receives the CCA response message with the PCC Rules (Step 317), the PGW assigns a unique UE IP Address from the pool of IP Addresses allocated to the SP of the UE—the PGW determines the SP identity SP(id) of the UE based on the UE IMSI (Step 381). The PGW then sends a Create Session Response message to the SGW, including the assigned UE IP Address (Step 383), and the SGW sends a Create Session Response message to the MME, also including the assigned UE IP Address (Step 385). Then, the MME includes the assigned UE IP Address in the Initial Context Setup Request message to the eNodeB (Step 387). The eNodeB then maps the UE to its respective SP based on the UE IP Address included in the Initial Context Setup Request message and a copy of the IP-Address Mapping to SP(id) table hosted by the eNodeB (Step 389). Again, with the identification of the respective SP of the UE, the eNodeB and can manage the resources for the UE based on the particular SP subscriptions with the network operator.

For all downlink packets destined for a UE, the PGW will use IP address assigned to that UE as the destination address. When eNodeB receives the first downlink packet for a UE, from the IP address, the eNodeB will be able to associate the UE to its SP. FIG. 12 shows how IP address assignment done in 3GPP and according to example embodiments of the present invention.

This embodiment may require minor modifications to the standard operation of the PGW with regard to the assignment of the IP Address to each UE, and the PGW will be configured with the IMSI to SP(id) mapping in order to assign the proper IP address to each UE.

UE-SP Association Based on PLMN-ID

Figure 9:
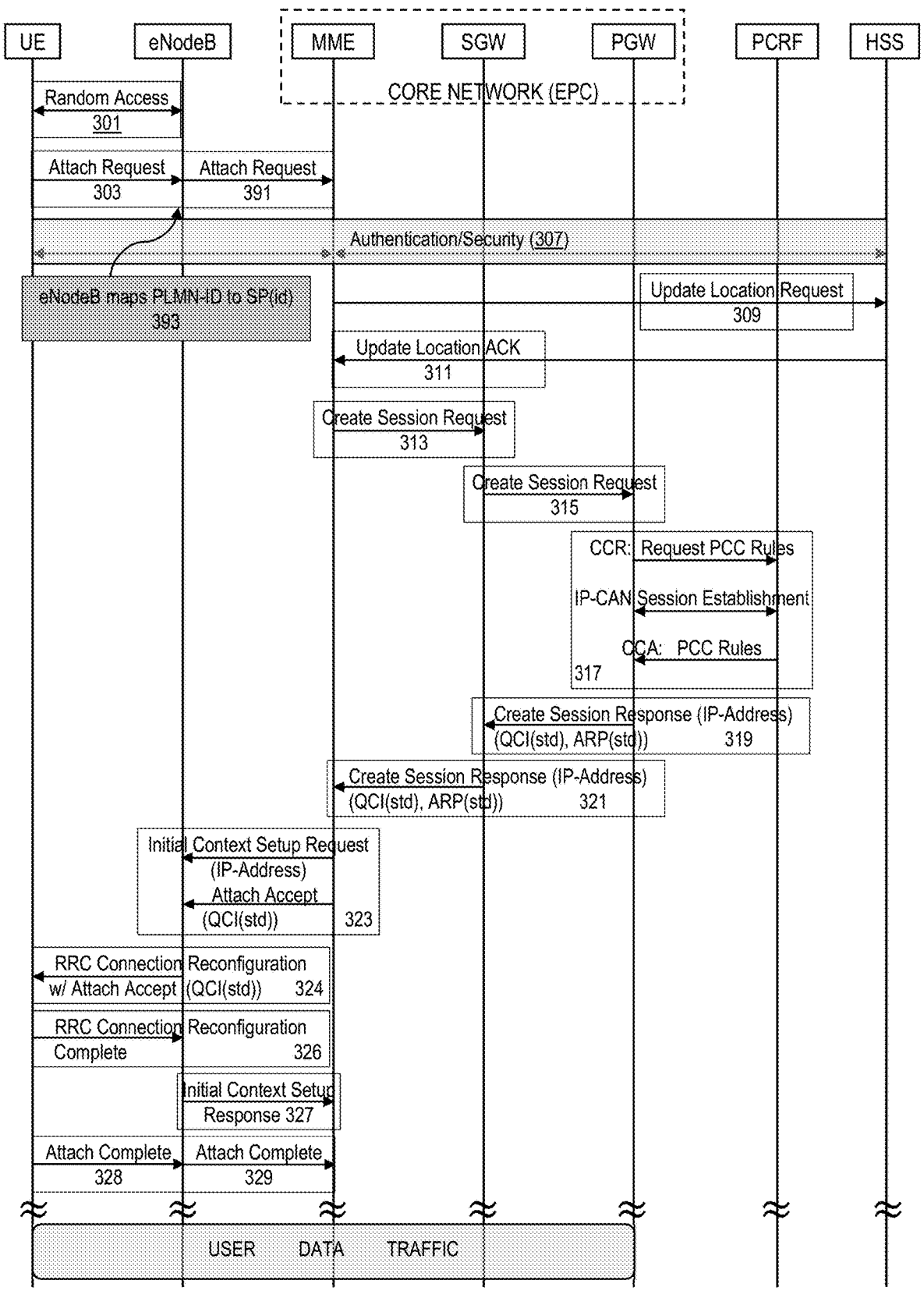
FIG. 9 illustrates messaging or signaling flow diagram depicting an example approach for UE-SP association, during the initial UE attach process (e.g., within an LTE network), based on PLMN ID, according to example embodiments of the present invention.

FIG. 9 illustrates a messaging or signaling flow diagram depicting an example approach for UE-SP association, during the initial UE attach process (e.g., within an LTE network), based on PLMN ID, according to example embodiments of the present invention. As provided above with reference to FIG. 3, at an initial setup point (e.g., upon UE power-on), the UE first selects a network based on the Public Land Mobile Network (PLMN) identifier stored in the subscriber identity module (SIM) card of the UE. Each eNodeB broadcasts the PLMN for the respective network, and via random access, the UE identifies the eNodeB for the network to which it subscribes based on a match between the PLMN stored in its SIM card and the PLMN broadcast by the appropriate eNodeB. In a multi-SP network sharing scenario according to example embodiments, multiple SPs may share a core network. In this context, each core network is associated with only one PLMN-ID, so the eNodeB maps the PLMN-ID of each CN to a respective block or pool of PLMN-IDs, where each PLMN-ID of that pool is associated with a SP(id) that shares the respective CN. The eNodeB broadcasts or advertises the pool of PLMN IDs for each CN that can be attached to the eNodeB. Each UE has a SIM card that has been provisioned with the PLMN-ID of its service provider. As such, a UE will identify the eNodeB for the CN and SP with which it subscribes based on a match between a one of the advertised PLMN-IDs of the respective CN and the PLMN-ID stored in the UE SIM card. According to one such embodiment, the eNodeB is provisioned with a mapping table or database that maps the PLMN-ID of each CN to a pool of PLMN-IDs, where each PLMN-ID of the pool is associated with a respective SP(id). An example mapping is shown in Table 9 (below).

TABLE 8

CN PLMN-ID Mapping to SP(id)

| CN PLMN-ID | SP PLMN-ID | SP(id) |
|---|---|---|
| A | PLMN-ID(1A) | 1A |
|   | PLMN-ID(2A) | 2A |
|   | ... | ... |
|   | PLMN-ID(xA) | xA |
| B | PLMN-ID(1B) | 1B |
|   | PLMN-ID(2B) | 2B |
|   | ... | ... |
|   | PLMN-ID(yB) | yB |
| ... | ... | ... |
| N | PLMN-ID(1N) | 1N |
|   | PLMN-ID(2N) | 2N |
|   | ... | ... |
|   | PLMN-ID(zN) | zN |

In further accordance with the present embodiment, once the UE identifies the appropriate eNodeB based on the PLMN-ID match, with the Attach Request sent to the eNodeB, the UE includes the PLMN-ID stored in its SIM card (Step 391). The eNodeB then maps the PLMN-ID included with the Attach Request to the respective core network and service provider identifier SP(id) (Step 393)—based on the CN PLMN-ID Mapping to SP(id) Table hosted by the eNodeB. With the identification of the selected CN, the eNodeB continues the Attach Process with that CN, and with the identification of the respective SP of the UE, the eNodeB and can manage the resources for the UE based on the particular SP subscriptions with the network operator.

According to the present embodiment, since PLMN selection is a standard procedure, the 3GPP LTE standard UE signaling at the initialization of the Attach Process, and the standard operation of the CN, need not be modified to accommodate such a PLMN-based UE-SP association scheme. With regard to the eNodeB, however, modifications to the standardized Attach Process would be required to facilitate the mapping of the UE PLMN-ID to the respective CN and the identification of the SP(id) from the UE PLMN- ID. Further, each service provider would provision the UE's of their respective subscribers with an appropriate PLMN-ID in the SIM card.

Figure 10:
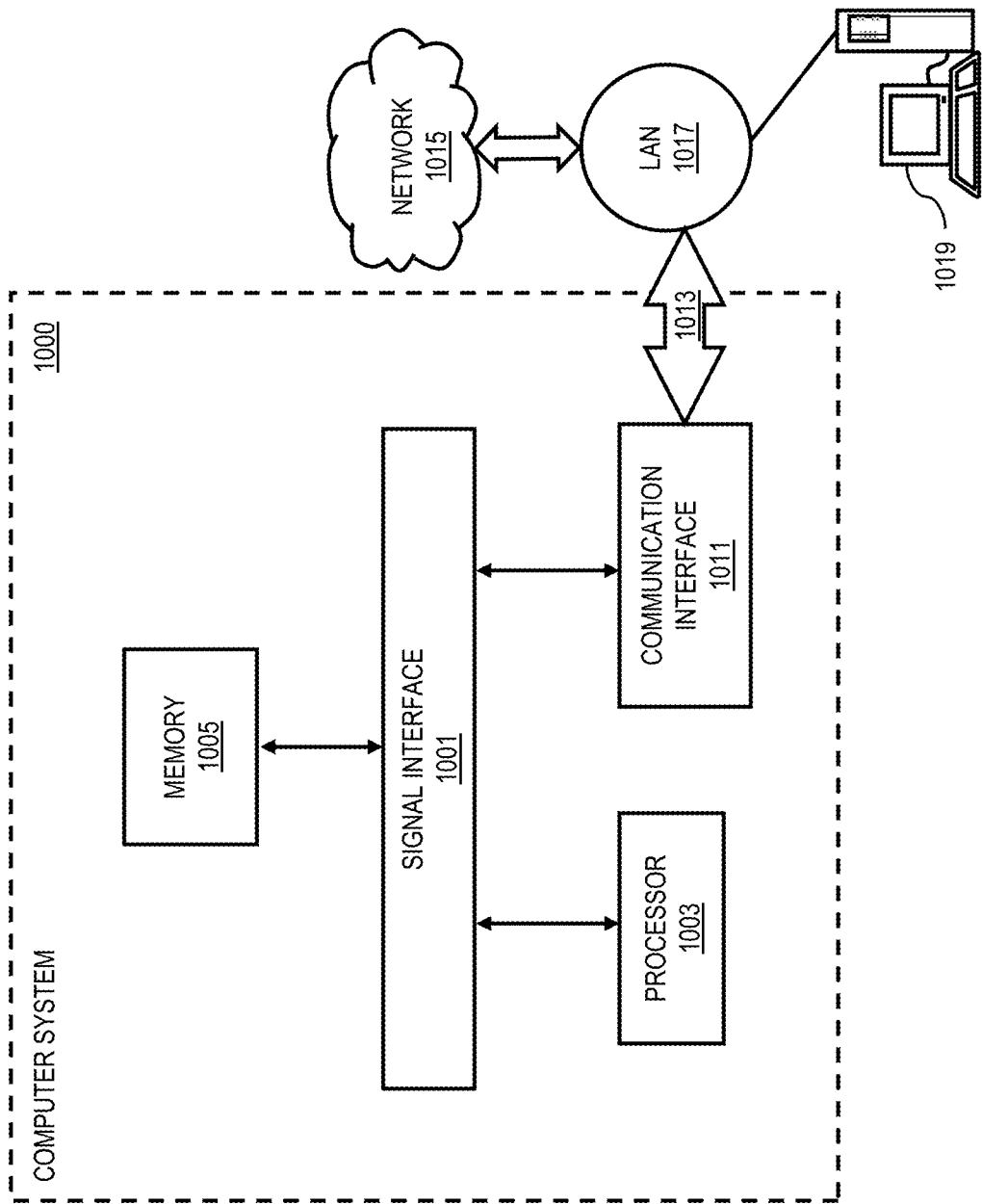
FIG. 10 illustrates a computer system that may be employed for performing various functions or processes of the example embodiments of the present invention described herein.

FIG. 10 illustrates a computer system 1000 that may be employed for performing various functions or processes of the example embodiments of the present invention described herein. The computer system 1000 includes a signal interface 1001 or other communication mechanism for communicating information of data signals, and a processor 1003 coupled to the signal interface for processing information. The computer system also includes one or more memory or storage devices (shown in the Figure as one device) 1005. The memory device(s) may comprise any storage medium, such as a random access memory (RAM), read only memory (ROM), or other forms of storage devices (which can be implemented via optical, magnetic, solid state, or other storage technologies). The memory is coupled to the signal interface for storing information and instructions to be executed by the processor. The memory can also be used for storing temporary variables or other intermediate information during execution of instructions to be executed by the processor.

Approaches for network equipment and resource sharing in a communications network, amongst a plurality of service providers, or certain aspects or processes of such approaches, in accordance with example embodiments of the present invention, may be implemented in a system like that of the computer system 1000—whereby the processor may execute an arrangement of instructions contained in the memory, which may cause the processor to perform operations and processes of the example embodiments described herein. Such a computer system may also be implemented in the form of a multi-processing architecture (not shown), or in a distributed computing environment, with different functions and processes being distributed or allocated amongst a plurality of computing, gateway, server, or other nodes throughout the communications network. In alternative embodiments, integrated circuitry may be used in place of or in combination with the components of the computing system 1000, such as microprocessors, application specific integrated circuits (ASICs), field programmable gate arrays (FPGAs), or other devices operable to be configured or programmed to implement such functions and processes. Thus, embodiments of the present invention are not limited to any specific combination of hardware circuitry and software.

The computer system 1000 may further include a communication interface 1011 coupled to an external network interface 1013. The communication interface may provide a two-way data communication coupling to the network interface, which may further be coupled to an external network, such as the local area network (LAN) 1017 For example, the communication interface 1011 may be a digital subscriber line (DSL) interface, an integrated services digital network (ISDN) interface, or other network communications interface for providing a data communication connection to the external network 1015 via the LAN 1017. As another example, communication interface 1011 may be a local area network (LAN) interface (e.g. for Ethernet™ or an Asynchronous Transfer Mode (ATM) network) to provide a data communication connection to a compatible LAN. Further, wireless links can also be implemented. Further, the communication interface 1011, for example, may further include peripheral interface devices, such as a Universal Serial Bus (USB) interface, a PCMCIA (Personal Computer Memory Card International Association) interface, etc. (not shown). The network interface 1013 may provide data communications through one or more networks to other data devices. For example, the network interface 1013 provides a connection through local network 1017 to a host computer 1019, and has connectivity to a network 1015 (e.g. a wide area network (WAN) or the global packet data communication network (e.g., the "Internet") or to data equipment operated by service provider.

Further, a module or component (as referred to herein) may be composed of software component(s), which are stored in a memory or other computer-readable storage medium, and executed by one or more processors or CPUs of the respective devices. A module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store. Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical storage media, magnetic storage media or electrical storage media (e.g., solid state storage media). Volatile media include dynamic memory, such random access memory or RAM, and non-volatile memory include memory such as programmable read only memory (PROM), erasable PROM, flash EPROM, any other memory chip or cartridge, or any other such medium from which a processor can read data.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for facilitating sharing of equipment and network resources of a communications network amongst a plurality of service providers, the method comprising:
receiving, by a network device of a first node of the communications network, a control message from a user terminal (UT) which includes a user terminal identifier (UT-ID) associated with the UT, wherein the UT subscribes to communications services from a one of the plurality of service providers, wherein the plurality of service providers share a common core network of the communications network;
determining, by the network device, a one of a plurality of ID parameters that is associated with the UT-ID, wherein each ID parameter corresponds to a service provider identifier (SP(ID)) that identifies a respective one of the plurality of service providers and the one ID parameter corresponds to the SP(ID) that identifies the one service provider from which the UT subscribes to the communications services, and wherein the ID parameters also relate to one or more network parameters of a specific type utilized in standard network processes of the communications network unrelated to service provider identification;
providing, by the network device, the one ID parameter to a radio access network (RAN) device of a second node of the communications network;
determining, by the RAN device, the SP(ID) that corresponds with the one ID parameter;
establishing, by the RAN device, radio resources for the UT, wherein the radio resources provide the communications services to which the UT subscribes, and are configured based on share parameters defining a share of the network resources allocated to the one service provider to which the determined SP(ID) corresponds; and
managing and monitoring, by the RAN device, usage by the UT of the communications services.

2. The method according to claim 1, wherein the communications network is a 3GPP 4G LTE network, and wherein:
the control message corresponds to an attach process for the UT;
the specific type of the network parameters to which the ID parameters relate is a quality of service class identifier (QCI) parameter;
the UT-ID comprises an international mobile subscriber identity (IMSI) number associated with the UT;
the determination of the one of the plurality of ID parameters that is associated with the UT-ID comprises a mapping of the IMSI to the one ID parameter based on a predetermined correlation mapping of UT-IDs to respective ID parameters; and
the determination of the one SP(ID) that is associated with the one ID parameter comprises a mapping of the one ID parameter to the one SP(ID) based on a predetermined correlation mapping of ID parameters to respective SP(ID)s.

3. The method according to claim 2, wherein:
the network device of the first node of the communications network is a policy and rules charging function (PCRF) device; and
the method further comprises determining, by a mobility management entity (MME) of the common core network, a one QCI parameter that is associated with the one ID parameter by mapping the one ID parameter to the one QCI parameter based on a predetermined correlation mapping of ID parameters to respective QCI parameters, and providing the one QCI parameter and the one ID parameter to the RAN device.

4. The method according to claim 3, wherein the determination by the RAN device of the SP(ID) that corresponds with the one ID parameter comprises mapping the one ID parameter to the one SP(ID) based on the predetermined correlation mapping of ID parameters to respective SP(ID)s.

5. The method according to claim 1, further comprising:
determining, by the RAN device, at least one of the one or more network parameters of the specific type that is associated with the one ID parameter by mapping the one ID parameter to the at least one network parameter based on a predetermined correlation mapping of ID parameters to respective network parameters.

6. The method according to claim 1, wherein the communications network is a 3GPP 4G LTE network, and wherein:
the control message corresponds to an attach process for the UT;
the specific type of the network parameters to which the ID parameters relate is an allocation and retention priority (ARP) parameter;
the UT-ID comprises an international mobile subscriber identity (IMSI) number associated with the UT;
the determination of the one of the plurality of ID parameters that is associated with the UT-ID comprises a mapping of the IMSI to the one ID parameter based on a predetermined correlation mapping of UT-IDs to respective ID parameters; and
the determination of the one SP(ID) that is associated with the one ID parameter comprises a mapping of the one ID parameter to the one SP(ID) based on a predetermined correlation mapping of ID parameters to respective SP(ID)s.

7. The method according to claim 6, wherein:
the network device of the first node of the communications network is a policy and rules charging function (PCRF) device; and
the method further comprises determining, by the RAN device, a one ARP parameter that is associated with the one ID parameter by mapping the one ID parameter to the one ARP parameter based on a predetermined correlation mapping of ID parameters to respective ARP parameters.

8. The method according to claim 1, further comprising:
determining, by the RAN device, at least one of the one or more network parameters of the specific type that is associated with the one ID parameter by mapping the one ID parameter to the at least one network parameter based on a predetermined correlation mapping of ID parameters to respective network parameters.

9. The method according to claim 1, wherein the communications network is a 3GPP 4G LTE network, and wherein:
the control message corresponds to an attach process for the UT;
the specific type of the network parameters to which the ID parameters relate is an S1AP identifier for the UT;
the UT-ID comprises an international mobile subscriber identity (IMSI) number associated with the UT;

the determination of the one of the plurality of ID parameters that is associated with the UT-ID comprises a mapping of the IMSI to the one ID parameter based on a predetermined correlation mapping of UT-IDs to respective ID parameters;

the method further comprises assigning, by the network device, a one MME-UE-S1AP-ID to the UT from a group of MME-UE-S1AP-IDs associated with the one service provider from which the UT subscribes to the communications services; and the determination of the one SP(ID) that is associated with the one ID parameter comprises a mapping of the one MME-UE-S1AP-ID to the one SP(ID) based on a predetermined correlation mapping of MME-UE-S1AP-IDs to respective SP(ID)s.

10. The method according to claim 9, wherein the network device of the first node of the communications network is a mobility management entity (MME) of the common core network.

11. The method according to claim 1, wherein the communications network is a 3GPP 4G LTE network, and wherein:

the control message corresponds to an attach process for the UT;

the specific type of the network parameters to which the ID parameters relate is a tunnel endpoint identifier (TEID) of a data tunnel of the UT through the communications network;

the UT-ID comprises an international mobile subscriber identity (IMSI) number associated with the UT;

the determination of the one of the plurality of ID parameters that is associated with the UT-ID comprises a mapping of the IMSI to the one ID parameter based on a predetermined correlation mapping of UT-IDs to respective ID parameters;

the method further comprises assigning, by the network device, a one TEID for the data tunnel of the UT from a group of TEIDs associated with the one service provider from which the UT subscribes to the communications services; and the determination of the one SP(ID) that is associated with the one ID parameter comprises a mapping of the one TEID to the one SP(ID) based on a predetermined correlation mapping of TEIDs to respective SP(ID)s.

12. The method according to claim 11, wherein the network device of the first node of the communications network is a serving gateway (SGW) of the common core network, and the one TEID assigned to the UT is a GTP tunnel endpoint identifier of the SGW.

13. The method according to claim 1, wherein the communications network is a 3GPP 4G LTE network, and wherein:

the control message corresponds to an attach process for the UT;

the specific type of the network parameters to which the ID parameters relate is an IP Address of the UT;

the UT-ID comprises an international mobile subscriber identity (IMSI) number associated with the UT;

the determination of the one of the plurality of ID parameters that is associated with the UT-ID comprises a mapping of the IMSI to the one ID parameter based on a predetermined correlation mapping of UT-IDs to respective ID parameters;

the method further comprises assigning, by the network device, a one IP Address to the UT from a group of IP Addresses associated with the one service provider from which the UT subscribes to the communications services; and the determination of the one SP(ID) that is associated with the one ID parameter comprises a mapping of the one IP Address to the one SP(ID) based on a predetermined correlation mapping of IP Addresses to respective SP(ID)s.

14. The method according to claim 13, wherein the network device of the first node of the communications network is a policy and rules charging function (PCRF) device.

15. A communications network that facilitates sharing of network equipment and network resources of the communications network amongst a plurality of service providers, wherein the communications network comprises:

a network device of a first node of the communications network;

a radio access network (RAN) device of a second node of the communications network; and one or more user terminals;

wherein the network device is configured to receive a control message from a one of the user terminals (UT) which includes a user terminal identifier (UT-ID) associated with the one UT, wherein the one UT subscribes to communications services from a one of the plurality of service providers, wherein the plurality of service providers share a common core network of the communications network;

wherein the network device is further configured to determine a one of a plurality of ID parameters that is associated with the UT-ID, wherein each ID parameter corresponds to a service provider identifier (SP(ID)) that identifies a respective one of the plurality of service providers and the determined one ID parameter corresponds to the SP(ID) that identifies the one service provider from which the UT subscribes to the communications services, and wherein the ID parameters also relate to one or more network parameters of a specific type utilized in standard network processes of the communications network unrelated to service provider identification;

wherein the network device is further configured to provide the one ID parameter to the RAN device;

wherein the RAN device is configured to determine the SP(ID) that corresponds with the one ID parameter;

wherein the RAN device is further configured to establish radio resources for the one UT, wherein the radio resources provide the communications services to which the one UT subscribes, and are configured based on share parameters defining a share of the network resources allocated to the one service provider to which the determined SP(ID) corresponds; and wherein the RAN device is further configured to manage and monitor usage by the one UT of the communications services.

16. The communications network according to claim 15, wherein the communications network is a 3GPP 4G LTE network, and wherein:

the control message corresponds to an attach process for the one UT;

the specific type of the network parameters to which the ID parameters relate is a quality of service class identifier (QCI) parameter;

the UT-ID comprises an international mobile subscriber identity (IMSI) number associated with the one UT;

the determination of the one of the plurality of ID parameters that is associated with the UT-ID comprises a mapping of the IMSI to the one ID parameter based on a predetermined correlation mapping of UT-IDs to respective ID parameters; and the determination of the one SP(ID) that is associated with the one ID parameter comprises a mapping of the one ID parameter to the one SP(ID) based on a predetermined correlation mapping of ID parameters to respective SP(ID)s.

17. The communications network according to claim 16, further comprising:
a mobility management entity (MME) of the common core network; and
wherein the network device is a policy and rules charging function (PCRF) device;
wherein the MME is configured to determine a one QCI parameter that is associated with the one ID parameter by mapping the one ID parameter to the one QCI parameter based on a predetermined correlation mapping of ID parameters to respective QCI parameters, and to provide the one QCI parameter and the one ID parameter to the RAN device.

18. The communications network according to claim 17, wherein the determination by the RAN device of the SP(ID) that corresponds with the one ID parameter comprises mapping the one ID parameter to the one SP(ID) based on the predetermined correlation mapping of ID parameters to respective SP(ID)s.

19. The communications network according to claim 15, wherein the RAN device is further configured to determine at least one of the one or more network parameters of the specific type that is associated with the one ID parameter by mapping the one ID parameter to the at least one network parameter based on a predetermined correlation mapping of ID parameters to respective network parameters.

20. The communications network to claim 15, wherein the communications network is a 3GPP 4G LTE network, and wherein:
the control message corresponds to an attach process for the one UT;
the specific type of the network parameters to which the ID parameters relate is an allocation and retention priority (ARP) parameter;
the UT-ID comprises an international mobile subscriber identity (IMSI) number associated with the one UT;
the determination of the one of the plurality of ID parameters that is associated with the UT-ID comprises a mapping of the IMSI to the one ID parameter based on a predetermined correlation mapping of UT-IDs to respective ID parameters; and
the determination of the one SP(ID) that is associated with the one ID parameter comprises a mapping of the one ID parameter to the one SP(ID) based on a predetermined correlation mapping of ID parameters to respective SP(ID)s.

21. The communications network according to claim 20, wherein:
the network device is a policy and rules charging function (PCRF) device; and
the RAN device is further configured to determine a one ARP parameter that is associated with the one ID parameter by mapping the one ID parameter to the one ARP parameter based on a predetermined correlation mapping of ID parameters to respective ARP parameters.

22. The communications network according to claim 15, wherein the RAN device is further configured to determine at least one of the one or more network parameters of the specific type that is associated with the one ID parameter by mapping the one ID parameter to the at least one network parameter based on a predetermined correlation mapping of ID parameters to respective network parameters.

23. The communications network according to claim 15, wherein the communications network is a 3GPP 4G LTE network, and wherein:
the control message corresponds to an attach process for the one UT;
the specific type of the network parameters to which the ID parameters relate is an S1AP identifier for the one UT;
the UT-ID comprises an international mobile subscriber identity (IMSI) number associated with the one UT;
the determination of the one of the plurality of ID parameters that is associated with the UT-ID comprises a mapping of the IMSI to the one ID parameter based on a predetermined correlation mapping of UT-IDs to respective ID parameters;
the network device is further configured to assign a one MME-UE-S1AP-ID to the one UT from a group of MME-UE-S1AP-IDs associated with the one service provider from which the one UT subscribes to the communications services; and
the determination of the one SP(ID) that is associated with the one ID parameter comprises a mapping of the one MME-UE-S1AP-ID to the one SP(ID) based on a predetermined correlation mapping of MME-UE-S1AP-IDs to respective SP(ID)s.

24. The communications network according to claim 23, wherein the network device is a mobility management entity (MME) of the common core network.

25. The communications network according to claim 15, wherein the communications network is a 3GPP 4G LTE network, and wherein:
the control message corresponds to an attach process for the one UT;
the specific type of the network parameters to which the ID parameters relate is a tunnel endpoint identifier (TEID) of a data tunnel of the one UT through the communications network;
the UT-ID comprises an international mobile subscriber identity (IMSI) number associated with the one UT;
the determination of the one of the plurality of ID parameters that is associated with the UT-ID comprises a mapping of the IMSI to the one ID parameter based on a predetermined correlation mapping of UT-IDs to respective ID parameters;
the network device is further configured to assign a one TEID for the data tunnel of the one UT from a group of TEIDs associated with the one service provider from which the one UT subscribes to the communications services; and
the determination of the one SP(ID) that is associated with the one ID parameter comprises a mapping of the one TEID to the one SP(ID) based on a predetermined correlation mapping of TEIDs to respective SP(ID)s.

26. The communications network according to claim 25, wherein the network device is a serving gateway (SGW) of the common core network, and the one TEID assigned to the one UT is a GTP tunnel endpoint identifier of the SGW.

27. The communications network according to claim 15, wherein the communications network is a 3GPP 4G LTE network, and wherein:

the control message corresponds to an attach process for the one UT;

the specific type of the network parameters to which the ID parameters relate is an IP Address of the one UT;

the UT-ID comprises an international mobile subscriber identity (IMSI) number associated with the one UT;

the determination of the one of the plurality of ID parameters that is associated with the UT-ID comprises a mapping of the IMSI to the one ID parameter based on a predetermined correlation mapping of UT-IDs to respective ID parameters;

the network device is further configured to assign a one IP Address to the one UT from a group of IP Addresses associated with the one service provider from which the one UT subscribes to the communications services; and the determination of the one SP(ID) that is associated with the one ID parameter comprises a mapping of the one IP Address to the one SP(ID) based on a predetermined correlation mapping of IP Addresses to respective SP(ID)s.

28. The communications network according to claim 27, wherein the network device is a policy and rules charging function (PCRF) device.

* * * * *